United States Patent
Wang

(10) Patent No.: US 10,169,090 B2
(45) Date of Patent: Jan. 1, 2019

(54) FACILITATING TIERED SERVICE MODEL-BASED FAIR ALLOCATION OF RESOURCES FOR APPLICATION SERVERS IN MULTI-TENANT ENVIRONMENTS

(71) Applicant: salesforce.com, inc., San Francisco, CA (US)

(72) Inventor: Xiaodan Wang, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/634,289

(22) Filed: Feb. 27, 2015

(65) Prior Publication Data

US 2015/0178135 A1 Jun. 25, 2015

Related U.S. Application Data

(63) Continuation-in-part of application No. 13/841,649, filed on Mar. 15, 2013, now Pat. No. 9,348,648.
(Continued)

(51) Int. Cl.
   *G06F 9/455* (2018.01)
   *G06F 9/50* (2006.01)
   (Continued)

(52) U.S. Cl.
   CPC ......... *G06F 9/5027* (2013.01); *G06F 9/5088* (2013.01); *G06F 17/30598* (2013.01);
   (Continued)

(58) Field of Classification Search
   None
   See application file for complete search history.

(56) References Cited

U.S. PATENT DOCUMENTS 5,432,926 A 7/1995 Citron et al.
5,577,188 A 11/1996 Zhu
(Continued)

FOREIGN PATENT DOCUMENTS

EP 1510917 3/2005
EP 2895954 A1 7/2015
(Continued)

OTHER PUBLICATIONS

U.S. Appl. No. 13/841,417 Non-Final Office Action dated Dec. 25, 2016, 13 pages.
(Continued)

*Primary Examiner* — Lewis Alexander Bullock, Jr.
*Assistant Examiner* — Melissa A Headly
(74) *Attorney, Agent, or Firm* — Jaffery Watson Mendonsa & Hamilton LLC

(57) ABSTRACT

In accordance with embodiments, there are provided mechanisms and methods for facilitating tiered service model-based fair allocation of resources for application servers in multi-tenant environments. In one embodiment and by way of example, a method includes collecting, by and incorporating into the database system, data relating to job types associated with one or more tenants of a plurality of tenants within a multi-tenant database system, computing, based on the data, an actual resource use and an expected resource allocation associated with each job type, and assigning classifications to the job types based on their corresponding actual resource use and the expected resource allocation. The method may further include routing the job types between tiers based on the assigned classifications, where the routing includes at least one of promoting, demoting, and maintaining one or more tiers for the job types.

21 Claims, 17 Drawing Sheets

Related U.S. Application Data

(60) Provisional application No. 61/945,606, filed on Feb. 27, 2014, provisional application No. 61/708,283, filed on Oct. 1, 2012, provisional application No. 61/711,837, filed on Oct. 10, 2012, provisional application No. 61/709,263, filed on Oct. 3, 2012, provisional application No. 61/700,032, filed on Sep. 12, 2012, provisional application No. 61/700,037, filed on Sep. 12, 2012.

(51) Int. Cl.
*G06F 17/30* (2006.01)
*H04L 12/755* (2013.01)
*H04L 12/747* (2013.01)
*H04L 12/24* (2006.01)

(52) U.S. Cl.
CPC .......... *H04L 45/021* (2013.01); *H04L 45/742* (2013.01); *H04L 41/5051* (2013.01); *H04L 41/5096* (2013.01)

(56) References Cited

U.S. PATENT DOCUMENTS

| | | |
|---|---|---|
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,909,540 A | 6/1999 | Carter et al. |
| 5,918,159 A | 6/1999 | Fomukong et al. |
| 5,937,205 A | 8/1999 | Mattson |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,263,359 B1 * | 7/2001 | Fong ............... G06F 9/4881 718/100 |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,260,589 B2 | 8/2007 | Cotner et al. |
| 7,289,976 B2 | 10/2007 | Kihneman et al. |
| 7,340,411 B2 | 3/2008 | Cook |
| 7,363,346 B2 | 4/2008 | Groner et al. |
| 7,620,655 B2 | 11/2009 | Larsson et al. |
| 7,640,339 B1 | 12/2009 | Caronni et al. |
| 7,706,895 B2 | 4/2010 | Callaghan |
| 7,730,478 B2 | 6/2010 | Weismann |
| 8,082,234 B2 | 12/2011 | Brown et al. |
| 8,321,558 B1 | 11/2012 | Sirota et al. |
| 8,458,715 B1 | 6/2013 | Khosla et al. |
| 8,504,691 B1 | 8/2013 | Tobler et al. |
| 8,527,473 B1 | 9/2013 | Brown et al. |
| 8,775,591 B2 | 7/2014 | Bobak et al. |
| 8,949,839 B2 | 2/2015 | Balasubramaniam et al. |
| 9,268,605 B2 | 2/2016 | Wang et al. |
| 2001/0044791 A1 | 11/2001 | Richter et al. |
| 2001/0051890 A1 | 12/2001 | Burgess |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0033191 A1 | 2/2003 | Davies et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |

(56) References Cited

U.S. PATENT DOCUMENTS

| | | |
|---|---|---|
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0183084 A1 | 8/2005 | Cuomo |
| 2005/0223022 A1 | 10/2005 | Weismann et al. |
| 2006/0122927 A1 | 6/2006 | Huberman et al. |
| 2007/0016663 A1 | 1/2007 | Weis |
| 2007/0055554 A1 | 3/2007 | Sussman et al. |
| 2007/0091841 A1 | 4/2007 | Bhushan et al. |
| 2007/0254628 A1 | 11/2007 | Rybak |
| 2007/0256077 A1* | 11/2007 | Zhong .................. G06F 9/505 718/104 |
| 2008/0120129 A1 | 5/2008 | Seubert et al. |
| 2008/0178187 A1 | 7/2008 | Altshuler et al. |
| 2009/0119080 A1 | 5/2009 | Gray et al. |
| 2009/0164635 A1 | 6/2009 | Denker et al. |
| 2009/0177356 A1 | 7/2009 | Plawecki |
| 2009/0177744 A1 | 7/2009 | Marlow et al. |
| 2009/0201935 A1 | 8/2009 | Hass et al. |
| 2009/0265205 A1 | 10/2009 | Stinchcombe et al. |
| 2009/0287592 A1 | 11/2009 | Brooks et al. |
| 2010/0049570 A1 | 2/2010 | Li et al. |
| 2010/0076805 A1 | 3/2010 | Batsakis et al. |
| 2010/0103938 A1 | 4/2010 | Musoll et al. |
| 2010/0229218 A1* | 9/2010 | Kumbalimutt ........ G06F 9/5005 726/4 |
| 2010/0235887 A1 | 9/2010 | Burch |
| 2011/0131645 A1 | 6/2011 | Johnson et al. |
| 2011/0231457 A1 | 9/2011 | Tager et al. |
| 2011/0296515 A1 | 12/2011 | Krstic et al. |
| 2012/0011518 A1 | 1/2012 | Duan et al. |
| 2012/0192194 A1 | 7/2012 | Richardson |
| 2012/0311153 A1 | 12/2012 | Morgan |
| 2013/0024496 A1 | 1/2013 | Krishnan |
| 2013/0060834 A1 | 3/2013 | Paramasivam et al. |
| 2013/0080559 A1 | 3/2013 | Rao et al. |
| 2013/0111031 A1 | 5/2013 | Hoffmann |
| 2013/0262931 A1 | 10/2013 | Siddalingesh |
| 2014/0068620 A1 | 3/2014 | Factor et al. |
| 2014/0074641 A1 | 3/2014 | Wang |
| 2014/0075017 A1 | 3/2014 | Wang et al. |
| 2014/0075445 A1 | 3/2014 | Wang et al. |
| 2014/0289418 A1 | 9/2014 | Cohen et al. |
| 2015/0066587 A1 | 3/2015 | Glommen et al. |

FOREIGN PATENT DOCUMENTS

| | | |
|---|---|---|
| GB | 2475897 | 6/2011 |
| JP | H0816410 B2 | 2/1996 |
| JP | 2004050550 A | 2/2004 |
| JP | 20150522931 A | 7/2010 |
| WO | 2009040901 A1 | 4/2009 |

OTHER PUBLICATIONS

Lee, Juong-Sik, Recurrent auctions in e-commerce, Rensslaer Polytechnic Institute, ProQuest Dissertations Publishing 2007, 3299458, 2 pages, downloaded from ProQuestDirect on the Internet on Sep. 21, 2015.
PCT/US2013/045509, Notification of Transmittal of the International Searching Report and the Written Opinion of the International Searching Authority, dated Oct. 9, 2013.
PCT International Preliminary Report on Patentability and Written Opinion of the International Searching Authority, International Application No. PCT/US2013/045509 dated Mar. 17, 2015, 5 pgs.
PCT/US2013/045511, Notification of Transmittal of the International Search Report and the Written Opinion of the International Searching Authority dated Oct. 9, 2013, 8 pgs.
Corrected Notice of Allowance for U.S. Appl. No. 13/841,649 dated Feb. 29, 2016, 2 pages.
Examination Report for Canadian Patent Application No. 2,883,883 dated Apr. 26, 2016, 4 pages.
Final Office Action for U.S. Appl. No. 13/841,417 dated Aug. 13, 2015, 10 pages.
Final Office Action for U.S. Appl. No. 13/841,489 dated Feb. 11, 2016, 27 pages.
Final Office Action for U.S. Appl. No. 13/841,588 dated Oct. 6, 2016. 11 pages.
Final Office Action for U.S. Appl. No. 13/841,649 dated Oct. 21, 2015, 19 pages.
First Office Action for Chinese Application No. 201380047246.8 dated Jun. 23, 2017, 14 pages.
International Preliminary Report on Patentability for PCT/US2013/045511 dated Mar. 26, 2015, 6 pages.
Non-Final Office Action for U.S. Appl. No. 13/841,417 dated Mar. 19, 2015, 13 pages.
Non-Final Office Action for U.S. Appl. No. 13/841,489 dated Apr. 24, 2017, 18 pages.
Non-Final Office Action for U.S. Appl. No. 13/841,489 dated Sep. 30, 2015, 24 pages.
Non-Final Office Action for U.S. Appl. No. 13/841,588 dated Sep. 23, 2015, 11 pages.
Non-Final Office Action for U.S. Appl. No. 13/841,649 dated May 8, 2015, 15 pages.
Non-Final Office Action for U.S. Appl. No. 13/841,713 dated Apr. 9, 2015, 10 pages.
Notice of Allowance for U.S. Appl. No. 13/841,417 dated Aug. 5, 2016, 7 pages.
Notice of Allowance for U.S. Appl. No. 13/841,649 dated Jan. 25, 2016, 13 pages.
Notice of Allowance for U.S. Appl. No. 13/841,713 dated Sep. 25, 2015, 25 pages.
Office Action for Japanese Application No. 2015-531916 dated Feb. 27, 2018, 11 pages.
Seconrd Office Action for Chinese Application No. 201380047246.8 dated Jan. 2, 2017, 6 pages.
U.S. Office Action from U.S. Appl. No. 13/841,489, dated Nov. 14, 2017, 13 pages.
U.S. Office Action from U.S. Appl. No. 14/526,185, dated Oct. 11, 2017, 23 pages.
U.S. Office Action from U.S. Appl. No. 13/841,588, dated Oct. 16, 2017, 13 pages.
Japanese Office Action for Application No. 2015-531916, dated Jun. 20, 2017, 23 pages.
Office Action from Chinese Patent Application No. 201380047246.8, dated Aug. 24, 2017, 6 pages.
Canadian Office Action for Application No. 2,883,883, dated Mar. 31, 2017, 3 pages.
Office Action from Chinese Patent Application No. 201380047246.8, dated Jan. 24, 2018, 5 pages.
Canadian Examination Report for 2,883,883, dated Jun. 9, 2018, 3 pages.
U.S. Appl. No. 13/841,489 Notice of Allowance, dated Jul. 9, 2018, 14 pages.
Shum, K. H. (1997). Replicating parallel simulation on heterogeneous clusters. Journal of Systems Architecture, 44 (3-4), 273-292.
U.S. Appl. No. 14/526,185 Final Office Action, dated Jul. 13, 2018, 18 pages.
Corrected Notice of Allowability for U.S. Appl. No. 13/841,489 dated Aug. 1, 2018, 4 pages.
Final Office Action for U.S. Appl. No. 13/841,588 dated Jul. 27, 2018, 12 pages.
Notification of Grant for Chinese Application No. 201380047246.8 dated Jul. 18, 2018, 4 pages.

* cited by examiner

US 10,169,090 B2

FACILITATING TIERED SERVICE MODEL-BASED FAIR ALLOCATION OF RESOURCES FOR APPLICATION SERVERS IN MULTI-TENANT ENVIRONMENTS

CLAIM OF PRIORITY

This application claims the benefit of and priority to U.S. Provisional Patent Application No. 61/945,606, entitled "Fair Allocation of Thread Resources via a Tiered Service Model in Multi-Tenant Environments", by Xiaodan Wang, filed Feb. 27, 2014 and is a continuation-in-part of U.S. patent application Ser. No. 13/841,649, entitled "Providing a Routing Framework for Facilitating Dynamic Workload Scheduling and Routing of Message Queues for Fair Management of Resources for Application Servers in an On-Demand Services Environment" by Xiaodan Wang, et al., filed Mar. 15, 2013, which claims the benefit of and priority to U.S. Provisional Patent Application No. 61/708,283, entitled "System and Method for Allocation of Resources in an On-Demand System" by Xiaodan Wang, et al., filed Oct. 1, 2012, U.S. Provisional Patent Application No. 61/711,837, entitled "System and Method for Auction-Based Multi-Tenant Resource Sharing" by Xiaodan Wang, filed Oct. 10, 2012, U.S. Provisional Patent Application No. 61/709,263, entitled "System and Method for Quorum-Based Coordination of Broker Health" by Xiaodan Wang, et al., filed Oct. 3, 2012, U.S. Provisional Patent Application No. 61/700,032, entitled "Adaptive, Tiered, and Multi-Tenant Routing Framework for Workload Scheduling" by Xiaodan Wang, et al., filed Sep. 12, 2012, U.S. Provisional Patent Application No. 61/700,037, entitled "Sliding Window Resource Tracking in Message Queue" by Xiaodan Wang, et al., filed Sep. 12, 2012, the benefit of and priority to all applications are claimed thereof and the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to facilitating tiered service model-based fair allocation of resources for application servers in multi-tenant environments.

BACKGROUND

Large-scale cloud platform vendors and service providers receive millions of asynchronous and resource-intensive customer requests each day that make for extremely cumbersome resource allocation and scalability requirements for the service providers. Most customers get frustrated waiting for their request to be fulfilled because none of the conventional techniques provide for any real-time guarantees in responding to such requests. Moreover, multi-tenancy means that multiple users compete for a limited pool of resources, making it even more complex to ensure proper scheduling of resources in a manner that is consistent with customer expectations.

Distributing point of delivery resources, such as application server thread time, equitably among different types of messages has been a challenge, particularly in a multi-tenant on-demand system. A message refers to a unit of work that is performed on an application server. Messages can be grouped into any number of types, such as roughly 300 types, ranging from user facing work such as refreshing a report on the dashboard to internal work, such as deleting unused files. As such, messages exhibit wide variability in the amount of resources they consume including thread time. This can lead to starvation by long running messages, which deprive short messages from receiving their fair share of thread time. When this impacts customer-facing work, such as dashboard or apex futures, customers are likely to dislike and complain when faced with performance degradation.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
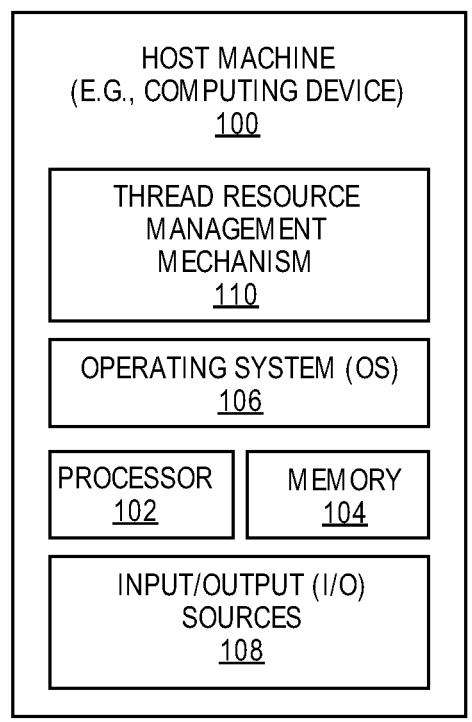
FIG. 1 illustrates a computing device employing a thread resource management mechanism according to one embodiment.

In accordance with embodiments, there are provided mechanisms and methods for facilitating tiered service model-based fair allocation of resources for application servers in multi-tenant environments. In one embodiment and by way of example, a method includes collecting, by and incorporating into the database system, data relating to job types associated with one or more tenants of a plurality of tenants within a multi-tenant database system, computing, based on the data, an actual resource use and an expected resource allocation associated with each job type, and assigning classifications to the job types based on their corresponding actual resource use and the expected resource allocation. The method may further include routing the job types between tiers based on the assigned classifications, where the routing includes at least one of promoting, demoting, and maintaining one or more tiers for the job types.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating tiered service model-based fair allocation of resources for application servers in multi-tenant environments.

Embodiments provide for scheduling framework for enforcing tiered service model-based fair allocation of thread resources across a large number (e.g., 500) of competing job types on top of asynchronous job processing infrastructure (e.g., Qpid-based Message Queue) of a service provider (e.g., Salesforce.com®). Embodiments introduce a range of novel, multi-tenant features, such as (without limitation) real-time monitoring of resource utilization at a per-tenant per-message or job type level, fair usage algorithms that automatically target victims ("VICTIMS") (e.g., tenants that are starved of resources) and offenders ("OFFENDERS") (e.g., tenants that monopolize too much resources) job types, and a tiered service model that incrementally tunes the number of application servers assigned to each job type to enforce fairness, etc.

In one embodiment, this novel tiered service model-based fair allocation of thread resources allows for precise and meaningful partitioning of application servers into tiers that provide varying capacity guarantees. A fair scheduler of the tiered service model may automatically migrate, at runtime, job types between different tiers of service to ensure that application server (and thus thread) resources are evenly distributed across competing job types. For example, a job type that is consuming below its fair share of resources (e.g., VICTIM) may be promoted to a higher tier of service, such that more application servers are processing their jobs. Similarly, a job type that is consuming too much resources (e.g., OFFENDER) may be demoted and allotted fewer application servers. In addition, the fair scheduler of the tiered service model may enforce business policy decisions with respect to assignment of application servers, in a meaningful way; specifically, each job type may be weighted differently such that it guarantees, for instance, one job type receives twice as much server resources as a competitor.

For example and in one embodiment, as will be further described with reference to FIG. 8, driving fair scheduling are any number and type of components, such as (without limitation) fair usage monitor for real-time monitoring of thread resources, database having a tenant and job registry and routing table, resource allocation logic (also referred to as "resource allocation engine") to serve as a core usage decision and enforcement algorithm, etc. In one embodiment, real-time monitoring of threads may be achieved by reporting thread time utilization from each application server to memcached distributed cache, where thread usage is broken down by each tenant and job type into a sliding window for a pre-determined period of time (e.g., 5 minutes). This technique may help determine an amount of resources that is consumed by each job type along with an amount of time that each job spends waiting on the queue. Similarly, the tenant and job registry may allow for differentiating job types so as to grant more resources to specific job types.

The core fair usage algorithm of resource allocation logic may be used to identify job types to target based on thread time utilization and time spent waiting on the queue; for example, it computes VICTIM and OFFENDER job types and ranks them by order of importance. In turn, this allows for allocation of additional capacity to the most starved job type before other job types. Further, the core fair usage algorithm may be used to target individual tenants. Next, fair usage decisions are applied to the routing table, which maintains the mapping of job types to tiers of service and thus, a decision to promote a job type to a higher tier is first persisted in the routing table and then read by application servers, which enforce the updated resource assignments accordingly.

For example, the contributions are as follows (without limitation): a tiered service model for resource allocation; adaptive slotting mechanism to partition and assigned servers to tiers of queues; tenant and job registry to capture business policy decisions regarding importance to individual jobs; starvation factor metric for categorizing and ranking jobs by fairness; fair usage algorithm that automatically identifies jobs to promote/demote; and resource allocation enforcement logic may incrementally migrate jobs between tiers to enforce fairness decisions made by resource allocation decision logic.

Large-scale cloud platform vendors and service providers receive millions of asynchronous and resource-intensive customer requests each day that make for extremely cumbersome resource allocation and scalability requirements for the service providers. Moreover, multi-tenancy means that multiple users compete for a limited pool of resources, making it even more complex to ensure proper scheduling of resources in a manner that is consistent with customer expectations.

Embodiments provide an adaptive, tiered, and multitenant routing framework for workload scheduling for routing traffic in a queue infrastructure (e.g., Qpid-based Message Queue infrastructure) to facilitate a range of novel, multi-tenant features and further to allow for dynamic allocation of message queue (e.g., Message Queue) resources and isolate traffic from competing organizations and scale out by sharing messages across multiple queue hosts or brokers, where queue hosts and brokers may be used interchangeably in subsequent discussions. Each queue host may manage a subset of jobs that are partitioned across one or more queues.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

Next, mechanisms and methods for facilitating a mechanism for employing and providing a routing framework for dynamic workload scheduling and routing of message queues for fair management of resources for application servers in a multi-tenant environment in an on-demand services environment will be described with reference to example embodiments.

FIG. 1 illustrates a computing device 100 employing a thread resource management mechanism 110 according to one embodiment. In one embodiment, computing device 100 serves as a host machine employing a thread resource management mechanism ("resource mechanism") 110 for message queues for facilitating dynamic management of application server thread resources facilitating fair and efficient management of thread resources and their corresponding messages, including their tracking, allocation, routing, etc., for providing better management of system resources as well as promoting user-control and customization of various services typically desired or necessitated by a user (e.g., a company, a corporation, an organization, a business, an agency, an institution, etc.). The user refers to a customer of a service provider (e.g., Salesforce.com) that provides and manages resource mechanism 110 at a host machine, such as computing device 100.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™, etc.), e-readers (e.g., Kindle® by Amazon.com®, Nook® by Barnes and Nobles®, etc.), Global Positioning System (GPS)-based navigation systems, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "client", "client device", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "application", "software application", "program", "software program", "package", and "software package" may be used interchangeably throughout this document. Moreover, terms like "job", "request" and "message" may be used interchangeably throughout this document.

Figure 2:
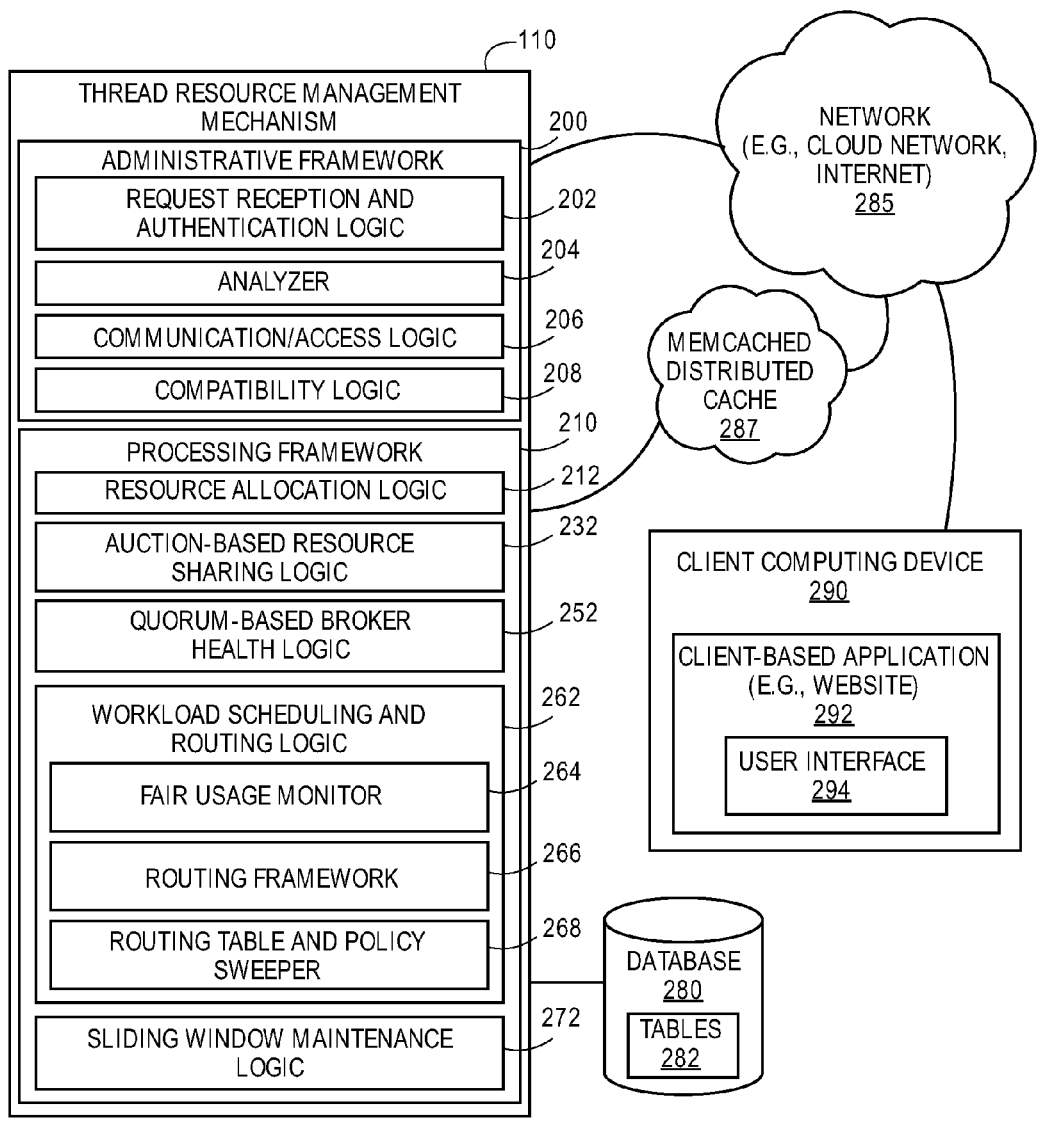
FIG. 2 illustrates a thread resource management mechanism including workload scheduling and routing logic according to one embodiment.

FIG. 2 illustrates a thread resource management mechanism 110 including workload scheduling and routing logic 252 according to one embodiment. In one embodiment, thread resource management mechanism ("resource management") 110 includes workload scheduling and routing logic ("workload logic") 262 to provide a novel instrumentation for adaptive, tiered, and multitenant routing framework for workload scheduling for routing traffic in a queue infrastructure to facilitate a range of novel, multi-tenant features and further to allow for dynamic allocation of message queue resources and isolate traffic from competing organizations and scale out by sharing messages across multiple brokers.

In the illustrated embodiment, resource mechanism 110 may include various components, such as administrative framework 200 including request reception and authentication logic 202, analyzer 204, communication/access logic 206, and compatibility logic 208. Resource mechanism 110 further includes additional components, such as processing framework 210 having resource allocation logic 212, auction-based resource sharing logic 232, quorum-based broker health logic 252, workload scheduling routing logic 262, and sliding window maintenance logic 272.

It is contemplated that any number and type of components may be added to and/or removed from resource mechanism 110 to facilitate various embodiments including adding, removing, and/or enhancing certain features. For brevity, clarity, and ease of understanding of resource mechanism 110, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

In some embodiments, resource mechanism 110 may be in communication with database 280 to store data, metadata, tables, reports, etc., relating to messaging queues, etc. Resource mechanism 110 may be further in communication with any number and type of client computing devices, such as client computing device 290 over network 285. Throughout this document, the term "logic" may be interchangeably referred to as "framework" or "component" or "module" and may include, by way of example, software, hardware, and/or any combination of software and hardware, such as firmware. This combination of components provided through resource mechanism 110 facilitates user-based control and manipulation of particular data products/software applications (e.g., social websites, business websites, word processing, spreadsheets, database products, etc.) to be manipulated, shared, communicated, and displayed in any number and type of formats as desired or necessitated by user and communicated through user interface 294 at client computing device 292 and over network 290.

It is contemplated that a user may include an administrative user or an end-user. An administrative user may include an authorized and/or trained user, such as a system administrator, a software developer, a computer programmer, etc. In contrast, an end-user may be any user that can access a client computing device, such as via a software application or an Internet browser. In one embodiment, a user, via user interface 294 at client computing device 290, may manipulate or request data as well as view the data and any related metadata in a particular format (e.g., table, spreadsheet, etc.) as desired or necessitated by the user. Examples of users may include, but are not limited to, customers (e.g., end-user) or employees (e.g., administrative user) relating to organizations, such as organizational customers (e.g., small and large businesses, companies, corporations, academic institutions, government agencies, non-profit organizations, etc.) of a service provider (e.g., Salesforce.com). It is to be noted that terms like "user", "customer", "organization", "tenant", "business", "company", etc., may be used interchangeably throughout this document.

In one embodiment, resource mechanism 110 may be employed at a server computing system, such as computing device 100 of FIG. 1, and may be in communication with one or more client computing devices, such as client computing device 290, over a network, such as network 285 (e.g., a cloud-based network, the Internet, etc.). As aforementioned, a user may include an organization or organizational customer, such as a company, a business, etc., that is a customer to a provider (e.g., Salesforce.com®) that provides access to resource mechanism 110 (such as via client computer 290). Similarly, a user may further include an individual or a small business, etc., that is a customer of the organization/organizational customer and accesses resource mechanism 110 via another client computing device. Client computing device 290 may be the same as or similar to computing device 100 of FIG. 1 and include a mobile computing device (e.g., smartphones, tablet computers, etc.) or larger computers (e.g., desktop computers, server computers, etc.).

In one embodiment, resource mechanism 110 facilitates fair and efficient management of message routing and queues for efficient management of system resources, such as application servers, etc., and providing better customer service, where the users may accessing these services via user interface 294 provided through any number and type of software applications (e.g., websites, etc.) employing social and business networking products, such as Chatter® by Salesforce.com, Facebook®, LinkedIn®, etc.

In one embodiment, request reception and authentication logic 202 may be used to receive a request (e.g., print a document, move a document, merge documents, run a report, display data, etc.) placed by a user via client computing device 290 over network 285. Further, request reception and authentication logic 202 may be used to authenticate the received request as well as to authenticate the user (and/or the corresponding customer) and/or computing device 290 before the user is allowed to place the request. It is contemplated that in some embodiments, the authentication process may be a one-time process conducted when computing device 290 is first allowed access to resource mechanism 110 or, in some embodiments, authentication may be a recurring process that is performed each time a request is received by request reception and authentication logic 202 at resource mechanism 110 at the cloud-based server computing device via network 285.

Once the authentication process is concluded, the request is sent to analyzer 204 to analysis and based on the results of the analysis, the request is forwarded on to processing framework 210 for proper processing by one or more components 212, 232, 252, 262, 272 and their sub-components. Communication/access logic 206 facilitates communication between the server computing device hosting resource mechanism 110 and other computing devices including computing device 290 and other client computing devices (capable of being accessed by any number of users/customers) as well as other server computing devices. Compatibility logic 208 facilitates dynamic compatibility between computing devices (e.g., computing device 290), networks (e.g., network 285), any number and type of software packages (e.g., websites, social networking sites, etc.).

Workload logic 262 includes a number of components to achieve its tasks and such components include fair usage monitor 264, routing framework 266, routing table and policy sweeper ("sweeper") 268. Further, workload logic 262 may facilitate communication with and the use of memcached distributed cache ("mem-cache") 287, over network 285, where mem-cache 287 may be located at an application server which may include the host server computing device (e.g., host machine 100 of FIG. 1) that hosts resource mechanism 110 or may include any number and type of remote computing systems in communication with the host server computing device and/or any number and type of client computing systems, such as client computing device 290. In one embodiment, a number of tables 282, including routing table 306 and routing policy table 308 of FIG. 3, which may be, in one embodiment, stored at database 280 or in an alternative embodiment, stored at mem-cache 287. In one embodiment, routing framework 266 may facilitate and provide access to tables 282 and have the ability obtain any relevant data and/or metadata to perform any number and type of tasks related to workload logic 262.

In one embodiment, resource mechanism 110 and its workload logic 262 provides for a routing framework 266 facilitating a routing table to capture how message queue traffic is routed and processed. In one embodiment, workload logic 262 is adaptive in that it can be tuned, at runtime, how messages are processed for one or more organizations and/or message types. For example, in one embodiment, a single key column may be used that is hashed from multiple values (e.g., node, message type, organization id, and bucket id) and for easy parsing, in runtime, the status of routing table may be provided in a human-readable format so it may be manually parsed while allowing manual insertion of any entries that may be used to override the message enqueue/dequeue behavior. In another embodiment, the aforementioned process may be automated, such as workload logic 262 may automatically parse the status of the routing table as well as insert any corresponding entries to influence the message enqueue/dequeue behavior. With regard to the manual process, in some embodiments, the routing table may be updated manually using entries from an entry manual (e.g., manual for overriding rules) developed by system administrators, software developers, or the like. For example, an entry of P (for pending) is selected from the manual for overriding rules and inserted to mark the State column in the routing table in order to prevent any application servers from enqueuing messages before the required physical queues are allocated. As aforementioned, in some embodiments, these processes may be automated.

Further, the routing table stores rules that describe multi-tenant policy decisions, such as suspending processing for one organization, restricting a message type to consume no more than a threshold (e.g., 25%) of POD resources, isolating the traffic from competing organizations to prevent starvation, or promoting organizations to a higher tier of queues to provide better quality of service guarantees. Moreover, the routing table may redirect traffic in case of broker failures (e.g., Qpid broker failures) to provide high availability and as such, the routing table allows for incorporating a wide range of policy decisions needed to support the business.

In some embodiments, workload logic 262 provides extensibility, tiered-services, and hierarchical rules. Workload logic 262 captures policy decisions from a database node (e.g., Real Application Cluster (RAC®) node by Oracle®) level to that of an individual organization, which provides wide latitude to employ different algorithms for scheduling messages. A cluster or node combination refers to a consolidation of multiple databases ("database node" or simply "node"), such as RAC. A RAC may provide a database technology for scaling databases, where a RAC node may include a database computing host that processes database queries from various worker hosts. Further, the routing table facilitates tiered services by regulating, via the routing table, the amount of resources that a given message type or organization may consume. For instance, if an organization is monopolizing application server resources, its corresponding tier may be dropped such that fewer application servers service its messages. Additionally, routing table tracks each rule's lineage (for who created it) and hierarchy (for how important is it) and in turn, sweeper 268 of workload logic 262 automatically determines which policy rules from policy table to apply depending on the context (e.g., organization and message type) of each incoming message.

In one embodiment, workload logic 262 provides an adaptive and multi-tenant aware routing table to facilitate a dynamic regulation of resources consumed via a tier service module. Further, workload logic 262 provides an implicit matching of policy rules via tracking of lineage and hierarchy. Sweeper 268 facilitates a router sweeper process that automatically coordinates and repairs routing decisions in a distributed environment and further provides an automated migration of traffic in the presence of rule changes or failures. For example and in one embodiment, the routing table serves as the source of truth for determining the enqueue and dequeue destination for messages of a given type. Each row in the routing table maps messages of a specific type (e.g., node (e.g., RAC node), message type, and organization identification (id), etc.) to a physical queue in the transport. Routing table may be periodically updated by a routing job, such as every 15 minutes and to minimize calls to database 280, each application server may cache a local copy of routing table.

In one embodiment, fair usage monitor 264 is employed to facilitate fair usage of thread resources and to keep routing table general enough so each row in the routing table allows for enqueuing of messages of a specific types or attributes (e.g., node, message type, and organization identifier, etc., or a combination thereof) to a specific physical queue, where having these attributes in routing table may help minimize changes to the application server enqueue/dequeue logic.

In one embodiment, routing table may have separate columns, one each for node, message type, organization identifier, as well as bucket identifier, which together with state may form a composite key. In another embodiment, a single key column may be used that is hashed from multiple values (e.g., node, message type, organization id, and bucket id) to easily parse the status of routing table, at runtime, in a human readable format and manually insert any entries that override message enqueue/dequeue behavior. For example, a number of columns may be dedicated to various attributes, such as, but not limited to, a column may be dedicated to RAC_NODE referring to a value denoting a node (e.g., null may denote to nodes), MESSAGE_TYPE may refer to a value denoting the message type (e.g., null denotes all message types), ORG_ID may refer to a value denoting the organization id (e.g., null denotes all organizations or organization-based bucketing), BROKER_ID may refer to a broker to enqueue messages, SCOPE may refer to the scope for a routing table to distinguish routing entries from tests or in case of multiple dequeue clusters, MESSAGE_QUEUE_ROUTING_ID may refer to the primary key, etc. It is contemplated that a schema may be employed to perform and/or change or override the aforementioned processes and tasks.

In one embodiment, routing table may include a manual override table representing a second MESSAGE_QUEUE_ROUTING_OVERRIDE table to contain additional descriptors for manually created rules to reduce the amount of redundant data from denormalization (e.g., having multiple routing table entries that correspond to the same manual rule). The manual override table may provide information about a number of attributes in columns, such as, but not limited to, ROUTING_OVERRIDE_ID representing the primary key id for the manual rule which can span multiple routing table entries that map to the same physical queue, CREATED_BY representing the user id of the person who created the manual rule, REASON representing the reason for the manual rule, etc. Other alternative schema of routing table may include configuration table (e.g., for each message type, having a boot strap info), routing decision table (e.g., not store data from configuration decisions), physical queue assignments table, etc.

Updating Routing Table with Manual Override Rules

In some embodiment, routing table may be updated using manual override rules, such that manually specified routing, at runtime, are first inserted in routing table with State marked P (pending) to prevent application servers from enqueuing messages based on the manual override decision before the required physical queues are allocated. On the next run of the routing job, the new manual rules may be reconciled with the rest of the routing table by marking State M for a corresponding entry. This way, any application server that refreshes its local copy of routing table at this point may enqueue messages to the newly allocated queue. Further, physical queues assigned to redundant entries in the routing table may be zeroed out and returned for reuse. If the routing job fails before reaching this point in the processes, any redundant entries are cleaned up at the next run. The corresponding physical queues are returned for reuse and it is to be noted that the existing messages on the queue are re-enqueued in the correct queue when they are found to be dequeued from the incorrect queue.

Updating the Routing Table

In one embodiment, routing table may be updated incrementally to account for one or more of: new message types, manual override rules, and rules that suspend processing of certain messages. To ensure that each application server caches the latest routing rules, an updater job will run for a threshold amount of time, such as every 5 minutes, to query for any latest changes and such changes may be written to memcache distributed cache ("mem-cache") so that only one application server per dequeue cluster needs to query the routing table for the threshold time period, such as every 5 minutes. Moreover, the updater may run for every 15 minutes to incorporate new changes to routing table. These include one or more of: automated rules to handle new message types, user specified manual rules that override default routing behavior, or user rules that suspend message processing for certain message types. Further, to ensure that only a single application server is changing the routing table, each application server may compete for a lock.

Although new rules may be introduced or removed to/from routing table, independent of the updater job, these rules may be marked in the pending state, which means application servers may not act on these changes. For example, new rules may be added under the PENDING_ADD state, which ensures that application servers ignore them for routing purposes and further, any existing rules are removed by marking them under the PENDING_REMOVE state, which means that that application servers may continue to route messages according to these rules.

Routing Table Sweeper Job Overview and Update Interval and Locking Strategy

In some embodiments, a router sweeper job may update a routing table after every predefined time period, such as every 15 minutes. For example, across all application servers in the POD, only a single thread may update a routing table at one time, which is handled via a distributed lock. Only a single thread from one application server may update a routing table at one time and once it finishes, the thread may write a last updated timestamp to mem-cache indicating that no updates are required for the predefined threshold period of time, such as next 15 minutes. When the router sweeper job runs at a given application server, it may first read the last updated timestamp from mem-cache and if the value does not exist, then it may acquire a distributed lock (preventing two application servers from updating at the same time).

The two distributed locks may include, for example: 1) a first lock to prevent two sweeper jobs from running concurrently on different applications servers. This is released when the entire routing job completes; and 2) a second lock to prevent users from removing a manual rule when the sweeper job is processing new rules and dropping soft deleted rules. Since these removals are soft (e.g., we set the rule state as PENDING_REMOVE and wait for the sweeper job to physically drop the row) and if the user manually removes a rule while the sweeper job is running, the PENDING_REMOVE state may be overwritten by the sweeper job. Instead, when the sweeper job is running, it holds onto this lock, while the lock is released prior to running the fair usage algorithm by fair usage monitor 264.

Fix Bad Queues

The two locks are always acquired in the same order to prevent deadlocks from occurring and after both locks are acquired, the application server may query mem-cache again for the last update timestamp. This is since another application server might have recently released the lock following an update and when the timestamp value is set, the locks are released and skip updating the routing table. For example and in one embodiment, bad queues may be fixed and that operation may include 1) retrieving a list of rules from the routing table and the queues they may be using; 2) for each queue used, check that the queue is assigned correctly; 3) for suspend rules, that queue number may be checked to be within a valid range (1-100); and 4) for default queues this means that the queue is intended for the correct node and tier.

Some of the reasons why bad queues are to be fixed may include: 1) a total number of available queues are re-sized such as queues that belong to node 1 now belong to node 2; 2) the total number of queues are re-sized such that the queues from tier 1 are now assigned to tier 2; 3) an organization is migrated to another node; 4) the queues from a failed broker are reassigned to an active broker; and 5) the allowed maximum queue tier is changed for an existing rule.

For each rule that is assigned to the wrong queue, all the bad queues are released for reuse. For suspend rules or default rules using a dedicated queue, the queue name field is set to null. For default rules using shared queues, the reference count is reduced to the shared queue. If a shared queue is now invalid, all rules that depend on that queue are reassigned. For this reason, all references to "bad" queues are removed before the routing rules can be reassigned to the correct queue. For each rule from above, new queues are allocated in the correct queue range (e.g., suspend queues), node (e.g., RAC node), and tier, etc.

Bootstrap Configurations

In some embodiments, the first set of updates may include bootstrapping that overrides the default behavior for automatic (e.g., AUTO) routing rules. This includes bounding the maximum service tier for a message type or using shared queues. Each message type's AUTO routing rule is looped through and the current value for tier and queue allocation (e.g., dedicated vs. shared) strategy are compared with the bootstrap configurations. If there is a mis-match, the tier and queue allocation strategy are set to be based on the bootstrap. If the previous queue assignment is invalid (e.g., bootstrap bounds the tier to tier 2 but the message type was previously assigned to a tier 1 queue), then the routing rule may be reassigned to a new queue.

Add Rules for New Message Types

Each time a new message type is added, a node (e.g., RAC node), message type AUTO rule is set for it in which each message type is looped through, and a lookup is performed for the corresponding rule on each node. If AUTO rule is not found, a new node, message type routing rule is added in pending_add state for the newly introduced message type. For bootstrap configurations that override default tier or queue allocation (e.g., dedicated vs shared) strategy, the value from the bootstrap configurations is used.

Merge Suspend Rules

In one embodiment, new suspend rules are merged or deprecated suspend rules are dropped from a corresponding table, such as MESSAGE_QUEUE_SUSPEND_DATE table. For new suspend rules, a corresponding routing rule is created in the pending state, such as PENDING_ADD state. For routing rules without a corresponding entry in the suspend table, the rule is set for soft deletion, such as PENDING_REMOVE state (e.g., soft deletion). Similarly, and in some embodiments, soft deleted rules are dropped, pending rules are added, etc., to facilitate and enforce changing business requirements through the routing table.

The example of illustrating the use of technology disclosed herein should not be taken as limiting or preferred. This example sufficiently illustrates the technology disclosed without being overly complicated. It is not intended to illustrate all of the technologies disclose.

A person having ordinary skill in the art will appreciate that there are many potential applications for one or more implementations of this disclosure and hence, the implementations disclosed herein are not intended to limit this disclosure in any fashion.

Figure 3:
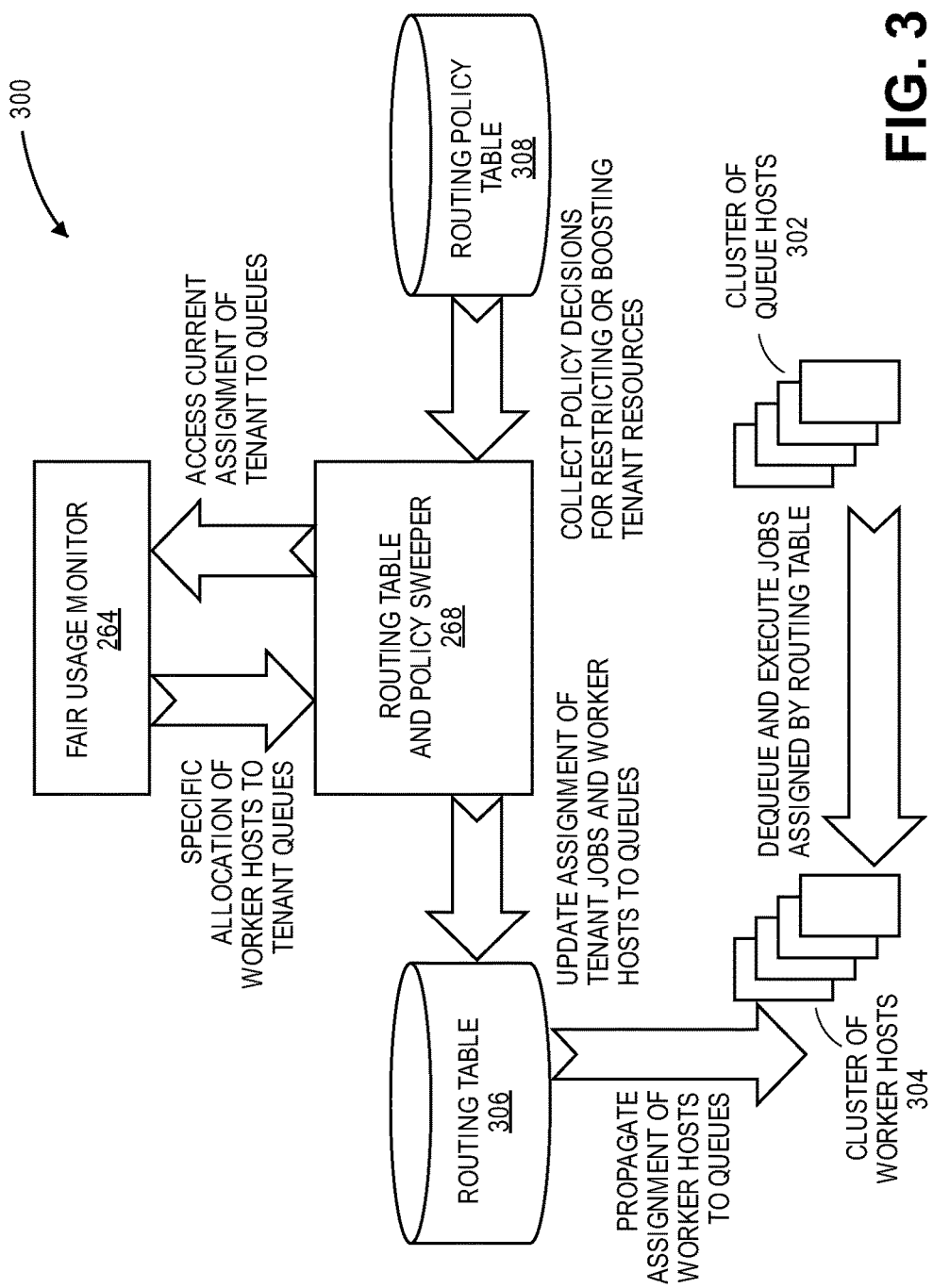
FIG. 3 illustrates an architecture for facilitating dynamic workload scheduling and routing of message queues for fair management of resources for application servers in a multi-tenant environment in an on-demand services environment according to one embodiment.

FIG. 3 illustrates an architecture 300 for facilitating dynamic workload scheduling and routing of message queues for fair management of resources for application servers in a multi-tenant environment in an on-demand services environment according to one embodiment. It is to be noted that for brevity and ease of understanding, most of the processes and components described with reference to FIGS. 1 and 2 are not repeated here with respect to FIG. 3 or with reference to any of the subsequent figures. In one embodiment, architecture 300 includes fair usage monitor 264 that maintain communication with routing table and policy sweeper 268 for facilitating a routing table sweeper process. In the illustrated embodiment, monitor 264 specifies the allocation of worker hosts to tenant queues to sweeper 268 and, in turn, receives access to the current assignment of tenant to such queues. As aforementioned, a tenant refers to an organization or a customer that places a request for a job via a user and through a user interface and a client computing device as illustrated with reference to FIG. 2.

In one embodiment, routing table 306 and routing policy table 308 of tables 282 of FIG. 2 may also maintain communication, via framework 266 of FIG. 2, with sweeper 268, where routing policy table 308 is accessed and used by sweeper 268 for collection of policy decisions for restricting and/or boosting tenant resources. Sweeper 268 may provide updated assignment of tenant jobs and worker hosts to queues to routing table 306. Routing table 306 then propagates assignment of worker hosts from a cluster of worker hosts 304 to queues. Further, a cluster of queue hosts 302 communicate with the cluster of worker hosts 304 for dequeuing and executing of jobs assigned by routing table 306.

Figure 4A:
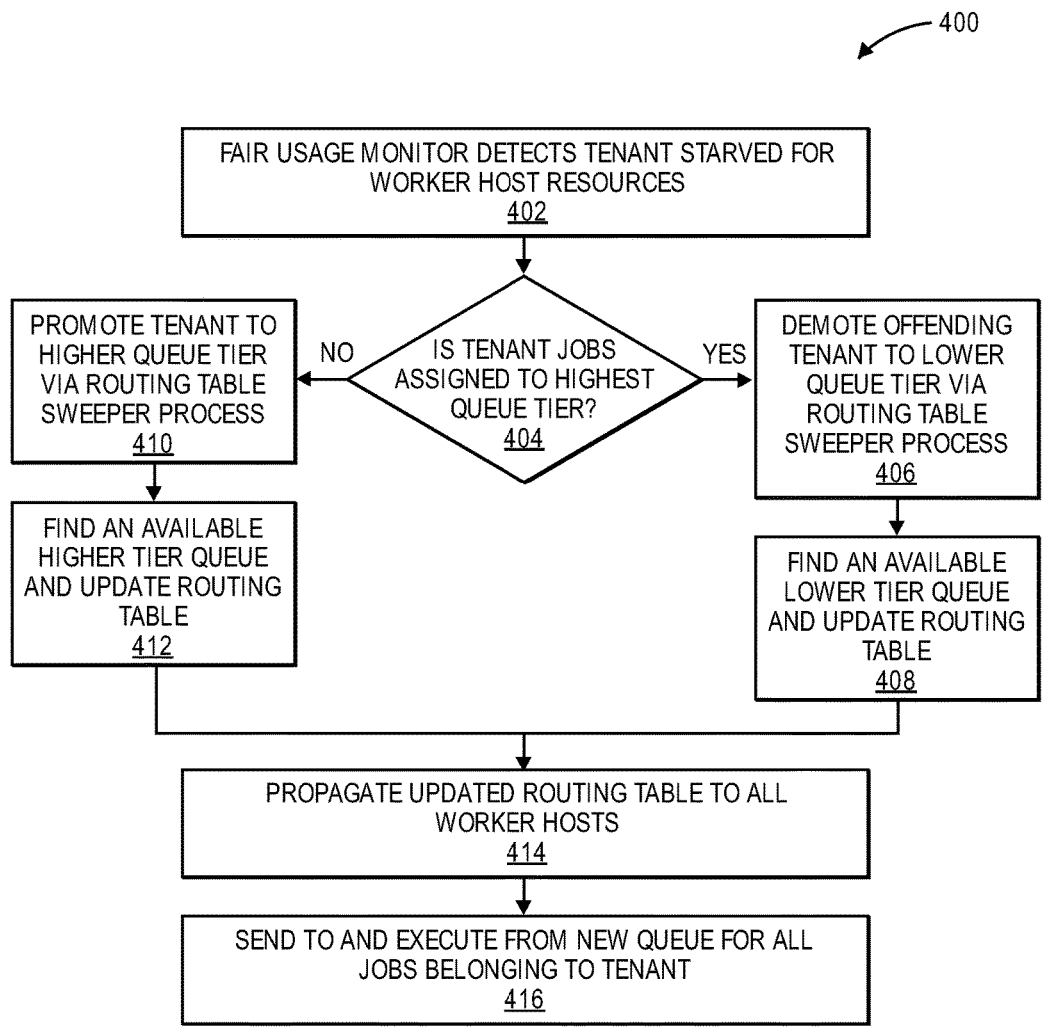
FIG. 4A illustrates a method for facilitating dynamic workload scheduling and routing of message queues for fair management of resources for application servers in a multi-tenant environment in an on-demand services environment according to one embodiment.

FIG. 4A illustrates a method 400 for facilitating dynamic workload scheduling and routing of message queues for fair management of resources for application servers in a multi-tenant environment in an on-demand services environment according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by thread resource management mechanism 110 of FIG. 1.

Method 400 describes a process relating to tiered queues for enforcing fair usage involving fair usage monitor 264 of workload logic 262 of FIGS. 2-3. Method 400 begins at block 402 with fair usage monitor detecting those tenants that are starved for worker host resources. At block 404, a decision is made as to whether the tenant jobs are assigned to a highest queue tier. If yes, at block 406, an offending tenant is demoted to the lower queue tier via a routing table sweeper process and thus, the available lower tier queue is found and the routing table is updated accordingly at block 408. If not, at block 410, the tenant is promoted to a higher queue tier via the routing table sweeper process and thus, the available higher tier queue is found and the routing table is updated accordingly. In one embodiment, at block 414, the updated routing table is propagated to all worker hosts in the cluster of worker hosts. At block 416, all jobs belonging to that tenant are sent to and executed from the new queue.

Figure 4B:
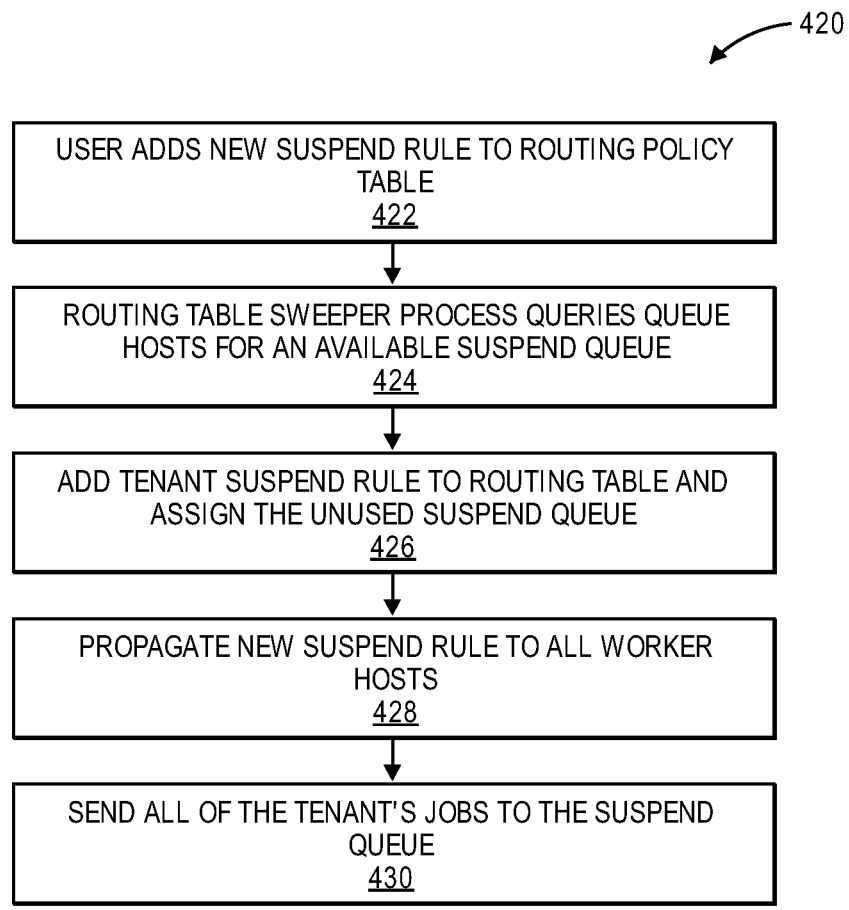
FIG. 4B illustrates a method for facilitating dynamic workload scheduling and routing of message queues for fair management of resources for application servers in a multi-tenant environment in an on-demand services environment according to one embodiment.

FIG. 4B illustrates a method 420 for facilitating dynamic workload scheduling and routing of message queues for fair management of resources for application servers in a multi-tenant environment in an on-demand services environment according to one embodiment. Method 420 may be performed by processing logic that may comprise hardware (e.g., circuitry, dedicated logic, programmable logic, etc.), software (such as instructions run on a processing device), or a combination thereof. In one embodiment, method 420 may be performed by thread resource management mechanism 110 of FIG. 1.

Method 420 describes a process relating to suspension of tenant jobs involving routing framework 266 of workload logic 262 of FIGS. 2-3. Method 420 begins at block 422 with a user associated with an organization adding a new suspend rule to routing policy table. At block 424, a routing table sweeper process queries the queue hosts for an available suspend queue. At block 426, a tenant suspend rule is added to the routing table and assigned the unused suspend queue. At block 428, the new suspend rule is propagated to all worker hosts. At block 430, all of the tenant's jobs are sent to the suspend queue.

Figure 4C:
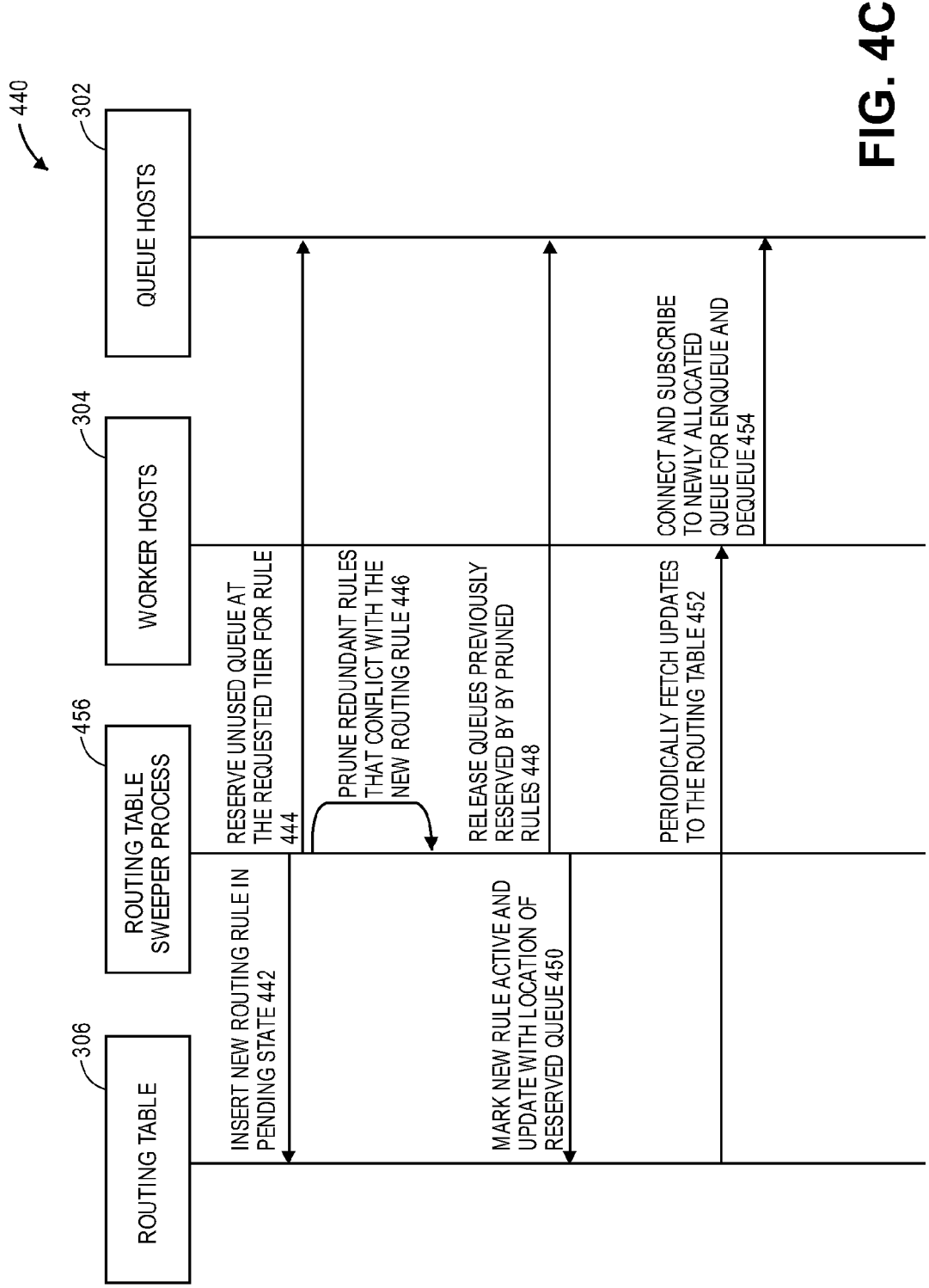
FIG. 4C illustrates a transaction sequence facilitating dynamic workload scheduling and routing of message queues for fair management of resources for application servers in a multi-tenant environment in an on-demand services environment according to one embodiment.

FIG. 4C illustrates a transaction sequence 440 facilitating dynamic workload scheduling and routing of message queues for fair management of resources for application servers in a multi-tenant environment in an on-demand services environment according to one embodiment. Transaction sequence 440 may be performed by processing logic that may comprise hardware (e.g., circuitry, dedicated logic, programmable logic, etc.), software (such as instructions run on a processing device), or a combination thereof. In one embodiment, transaction sequence 440 may be performed by thread resource management mechanism 110 of FIG. 1.

Transaction sequence 450 describes a transaction relating to additional and propagation of new routing rules involving routing framework 266 of workload logic 262 of FIGS. 2-3. Using the routing table sweeper process 456 being performed by sweeper 268 of FIG. 2 inserts new routing rules in the pending state in the routing table 306, whereas an unused queue is reserved 444 at the requested tier at a queue host of a cluster of queue hosts 302. Further during the routing table sweeper process 456, redundant rules that are in conflict with the new routing rule are pruned 446 and any queues previously reserved by the pruned rules are released 448. The new rule is marked active and is updated with the location of the reserved queue 450. In one embodiment, the updates are periodically fetched 452 to the worker hosts 302. The worker hosts 304 connect and subscribe to the newly allocated queue for enqueuing and dequeuing processes 454.

Figure 4D:
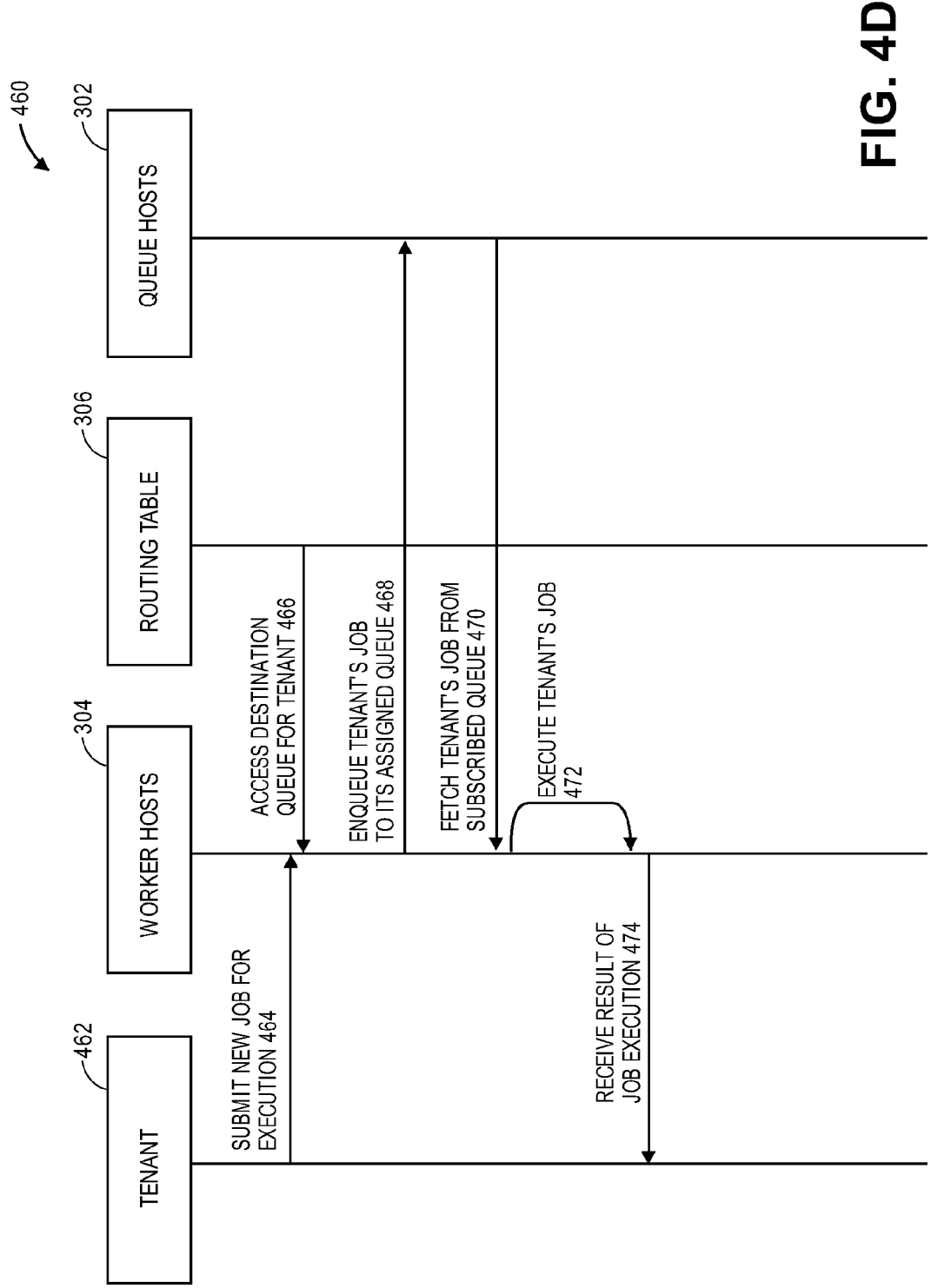
FIG. 4D illustrates a transaction sequence facilitating dynamic workload scheduling and routing of message queues for fair management of resources for application servers in a multi-tenant environment in an on-demand services environment according to one embodiment.

FIG. 4D illustrates a transaction sequence 460 facilitating dynamic workload scheduling and routing of message queues for fair management of resources for application servers in a multi-tenant environment in an on-demand services environment according to one embodiment. Transaction sequence 460 may be performed by processing logic that may comprise hardware (e.g., circuitry, dedicated logic, programmable logic, etc.), software (such as instructions run on a processing device), or a combination thereof. In one embodiment, transaction sequence 460 may be performed by thread resource management mechanism 110 of FIG. 1

Transaction sequence 460 describes a transaction relating to an end-to-end routing of jobs involving routing framework 266 of workload logic 262 of FIGS. 2-3. In one embodiment, a tenant 462 submits a new job request for execution 464, which is received at a worker host 304. Routing table 306 accesses a destination queue 466 for the tenant 462, where the tenant's job is enqueued to its assigned queue 468 at the queue host 302. Then, the tenant's job is fetched from the subscribed queue 470 at the worker host 304. At the worker host 304, tenant's job is executed 472 and any results of the executed job are sent to and received 474 at the tenant 462.

Figure 7:
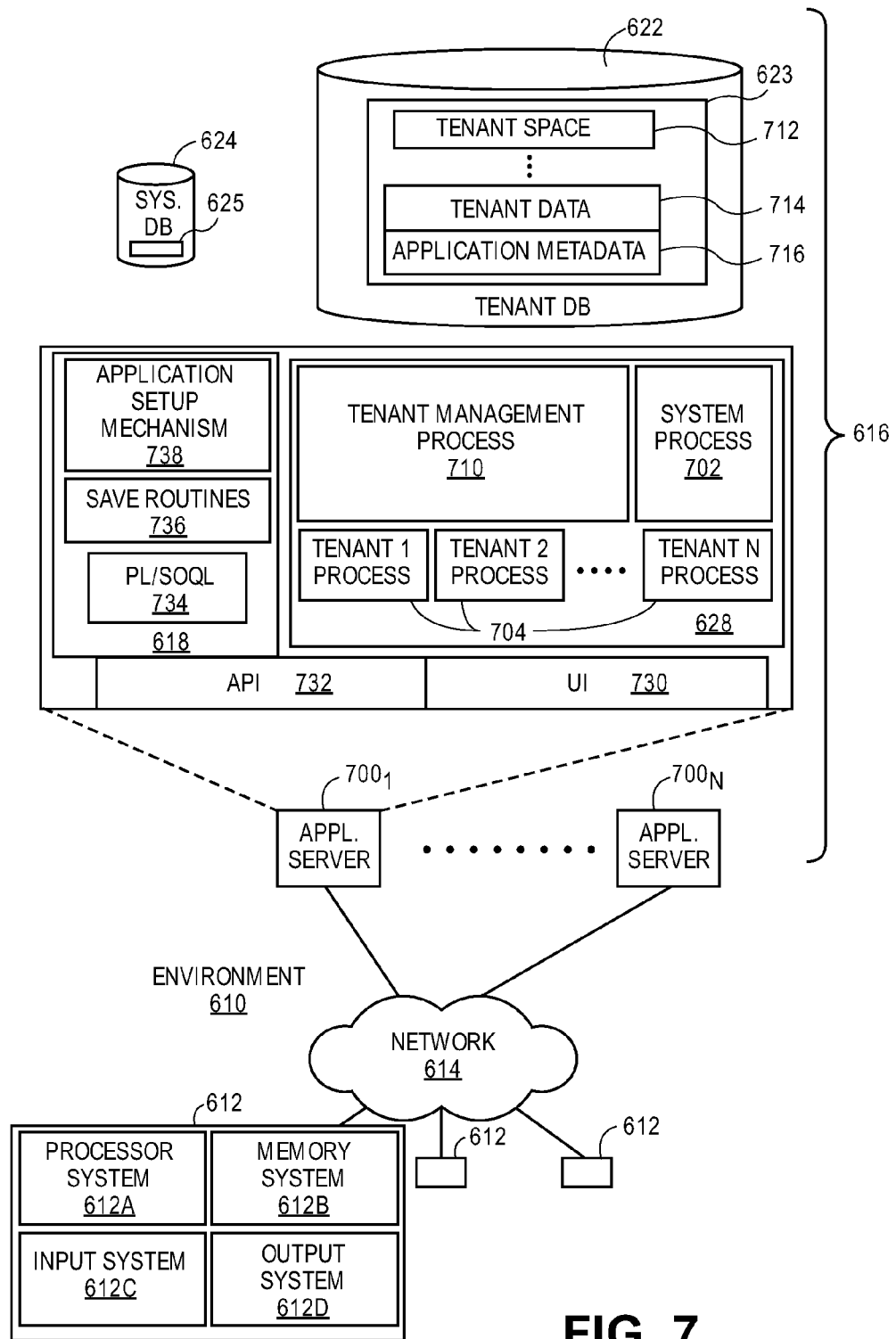
FIG. 7 illustrates elements of environment of FIG. 6 and various possible interconnections between these elements according to one embodiment.
Figure 8:
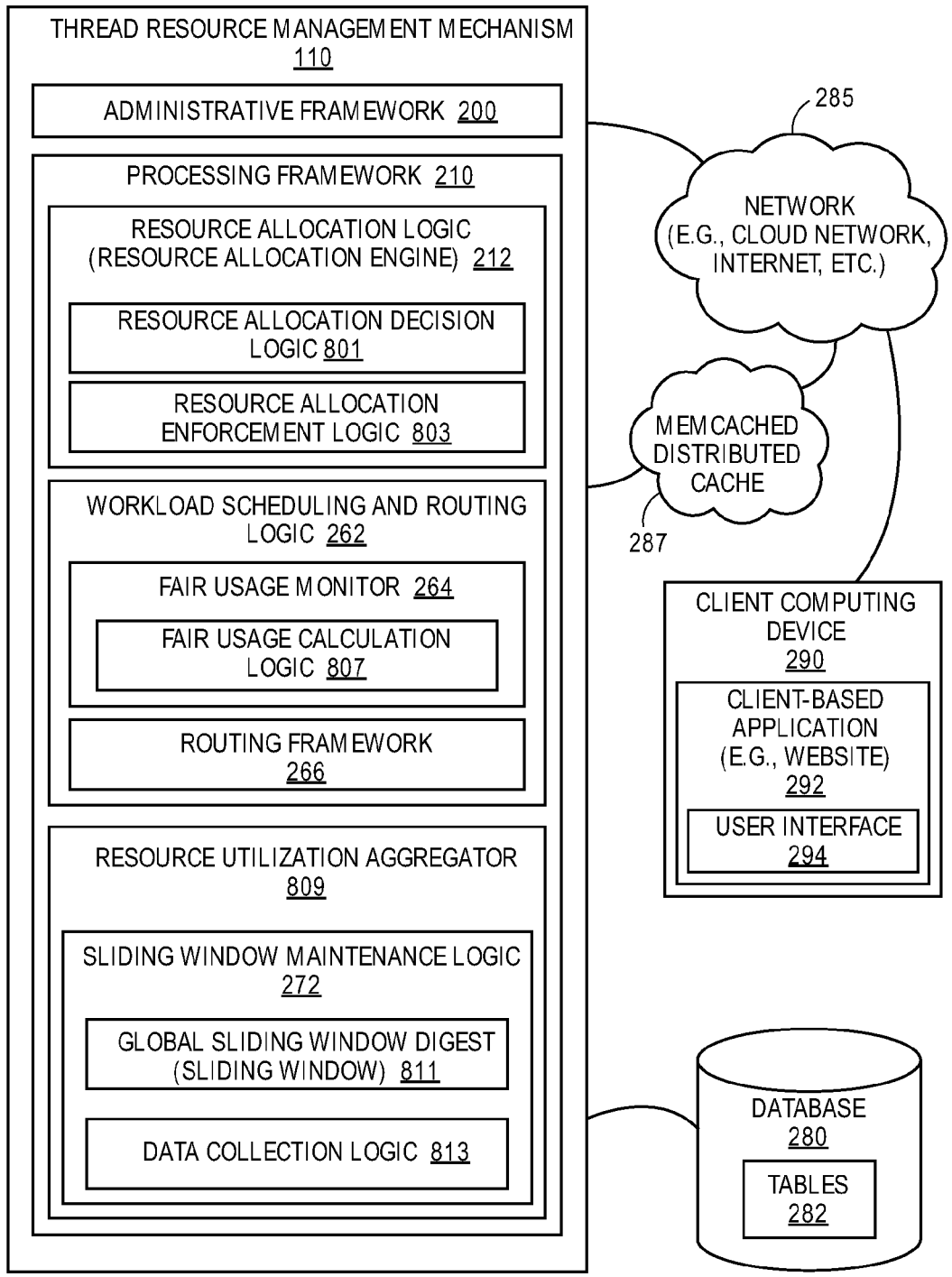
FIG. 8 illustrates thread resource management mechanism of FIG. 2 having additional components for facilitating tiered service model-based fair allocation of resources of application servers according to one embodiment.

Referring now to FIG. 8, it illustrates thread resource management mechanism 110 of FIG. 2 having additional components for facilitating tiered service model-based fair allocation of resources of application servers according to one embodiment. As an initial matter, it is to be noted that for brevity, clarity, and ease of understanding, many of the components and processes of FIGS. 1-7 are not mentioned or discussed hereafter. In one embodiment, computing device 100 of FIG. 1 may serve as a host machine employing resource mechanism 110 in communication with mem-cache 287, database 280 having tables 282, and one or more client computers, such as client computing device 290, over one or more networks, such as network 285.

In one embodiment, multiple tiers of service are provided in which a tier to which a job type is assigned helps determine how many application servers are available to service its request (e.g., those at higher tiers are prioritized and received a higher fraction of application servers, and in turn physical threads resources, within a POD). In one embodiment, backing these tiers is resource mechanism 110 that facilitates fair allocation of queuing resources (e.g., thread time, database Central Processing Unit (CPU), disk, etc., such that fair allocation of threads is implemented across competing job types.

In one embodiment, resource utilization aggregator ("aggregator") 809 may include sliding window maintenance logic ("window logic") 272 having collection logic 813 to work with global sliding window digest ("sliding window) 811 to collect data including various statistics about job types, organizations, application servers, resources, etc., such as data relating to resources consumed by tenants, job types, and a combination thereof, both completed and in-flight messages, backed by mem-cache with historical data (e.g., 30 minute history), etc. Further, in one embodiment, processing framework 210 of resource mechanism 110 may include workload logic 262 having routing framework 266 and fair usage monitor 264 including calculation logic 807 to calculate fair usage of resources by computing starvation factor and categorizing tenants and/or job types into one or more categories, such as VICTIM, OFFENDER, and FAIR. Similarly, in one embodiment, resource allocation logic ("resource allocation engine") 212 includes resource allocation decision logic ("decision logic") 801 and resource allocation enforcement logic ("enforcement logic" or "enforcer") 803 to facilitate promotion of victims to higher tiers, demotion of offenders to lower tiers, etc.

In one embodiment, fairness model as provided by resource mechanism 110 may allow each message/job type to receive, for example, $1/n^{th}$ share of thread time, assuming each job type is equally important and uniform in queuing times. For example, calculation logic 807 of fair usage monitor 264 may calculate actual usage and expected usage of each job type, where actual usage refers to total thread time for all completed and in-flight messages/jobs, and expected usage refers to total thread time for job types that are behaving fairly. For example and in one embodiment, fair usage may be calculated by calculation logic 807 of fair usage monitor 264 as follows: fair usage=(queuing time for job type*total available thread capacity)/sum of queuing time over all types.

Other relevant factors, such as starvation factor, may be computed as follows: starvation factor=(expected usage−actual usage)/expected usage. The starvation factor may be used to determine the metric relating to how fair/unfair a job type is behaving, such as greater than 0 (>0) may refer to a job type that is starved of its fair share, less than 0 (<0) may refer to a job type that is monopolizing more threads than it ought to have, and equal to 0 (=0) may refer to a job type that is receiving exactly its fair share. For example, −1 may refer to a job type that consumes twice the thread time it is supposed to have and be using.

In some embodiments, calculation logic 807 may further allow for assigning custom weights by job type via a scaling factor, f, such as f=2 for dashboards may imply that its jobs are twice as important and thus they may receive 2× or twice the thread time. Similarly, aggregator 809 may apply an aggregation usage over a period of time (e.g., 5 minutes) using sliding window 811. For example, an OFFENDER may refer to a queue or job type that receives more than 50% (<−0.5) of fair share, a FAIR queue or job type may refer to the one receiving a fair share, such as (−0.5 to 0.5) or >0.5 and <=20 minutes dequeuer latency, and a VICTIM may refer to a queue or job type that receives less than 50% (>0.5) of fair share and >20 minutes dequeuer latency. It is contemplated that any percentages, factors, time periods, etc., mentioned above and throughout this document are merely listed as examples for better understanding of various components and processes of resource mechanism 110 and that embodiments are not limited as such to any particular percentage amount, factors, and/or time periods, etc.

In one embodiment, decision and enforcement logic 801, 803 may allow for enforcing of fair usage as determined by aggregator 809 and workload logic 262, such as multiple tiers may be used to limit the fraction of application servers that can process jobs of a given type. For example, job types assigned to tier 1 queues may be most preferred having 100% of application servers processing jobs from these queues, tier 2 queues second most preferred having 75% of application servers, tier 3 queues being third most preferred having 50% of application servers, and tier 4 queues being least preferred having 25% of application servers, and so forth. The amount of resources being consumed by a job type may be adjusted or tuned by having the job type move between multiple tiers, such as tiers 1-4, etc.

In one embodiment, decision and enforcement logic 801, 803 are further to perform heuristic tasks that migrates queues between tiers based on their observed usage to achieve the desired fair usage outcome. Further, for example, queues may be sorted by increasing relevance, such as relevance=starvation factor*expected usage, where VICTIM job types that are deprived of the largest absolute thread time are ordered at the bottom, and OFFENDER job types that monopolize the most thread time are ordered at the top. Throttling queues for OFFENDER job types with the least relevance frees up the most absolute amount of capacity. This additional capacity is then used to boost the processing of VICTIM job types. Further, decision and enforcement logic 801, 803 may prioritize promotion/demotion of queues, and limit the number of queue changes to a predetermined number, such as 10 changes per iteration.

Continuing with resource allocation engine 212, in one embodiment, decision logic 801 and enforcement logic 803 may consider any number of factors to determine how a job type is to be classified, how the classified job type is to be treated, how the enforcement is to be prioritized, etc. For example and in one embodiment, the most starved VICTIM job type may be chosen and promoted to the next highest tier, such as from tier 3 (50%) to tier 2 (75%), but if the most starved VICTIM is already at a maximum tier, such as tier 1 (100%), an OFFENDER with the lowest relevance (most resources consumed) is chosen and demoted to the next lowest tier, such as from tier 2 (75%) to tier 2 (50%), and similarly, if the biggest OFFENDER is already at the lowest tier, such as tier 4 (25%), then a FAIR job type with the lowest relevance is chosen and demoted to the next lowest tier, such as from tier 2 (75%) to tier 3 (50%).

Referring back to fair usage monitor 264 and its calculation logic 807, as aforementioned, multiple tiers of service may be employed such that queues in Qpid may be partitioned into different tiers of service, such as a job waiting on a queue at tier 1 may be guaranteed to be serviced by more application servers than a queue at tier 2. The number of tiers may be configurable such that embodiments are not limited to any particular number of queues; however, for the sake of brevity, clarity, and ease of understanding, throughout this document, 4 tiers are referenced and used as follows: tier 1 with 100% of application servers, tier 2 with 75% of application servers, tier 3 with 50% of application servers, and tier 4 with 25% of application servers. When an application server first joins the Message Queue dequeue cluster, it is assigned a tier based on the order in which the application server joins the cluster and its ordering is numbered as a slot number, where slot numbers are hashed to tiers in such a way that, during steady state, a particular fraction of application servers may be guaranteed to be assigned to a tier, such as 75% of physical applications servers may be assigned to tier 2.

Once an application server is assigned to a tier, it subscribes to jobs from queues at or above that tier; for example, an application server at tier 1 may subscribe to only tier 1 queues, while an application server at tier 2 may subscribe to queues in both tier 1 and tier 2. In this way, the aforementioned guarantee may be enforced, such as a job on a tier 1 queue is serviced by more application servers than a job at a tier 2 queue. Finally, job types may be assigned to queues depending on, for example, how much thread resources the fair usage algorithm deems each job type should consume. By incrementally tweaking queue tier for each job type, fair usage is enforced by indirectly regulating the thread time consumed by each job type so as to punish any offenders (by demoting them to a lower tier) and/or reward any victims (by promoting them to a higher tier).

In one embodiment, an interface is employed that can take a set of sliding window thread time (users can substitute for any resource type) and queuing time measurements and compute the fairness metric for each queue. As aforementioned, the fairness metric used here is starvation factor which indicates the degree at which a request is starved for resources. Starvation factor is computed as a function of the actual thread time that jobs used vs the expected amount of resources if jobs behaved fairly, where fair is defined as $1/n^{th}$ share of available thread time, assuming uniform weights and queuing times. For example, let $S_i$ denote the starvation factor of queue i. If $S_i>0$, then the queue is regarded as unfairly starved of resources, while a starvation factor of 0.5 indicates that the queue received 50% fewer thread time than it should have received (e.g., maximum bound for $S_i$ being 1). If $S_i<0$, then the queue is monopolizing more resources than it should have used, where a factor of −1 indicates that the queue is utilizing twice as much resources than it should have used (e.g., $S_i$ is not lower bounded). Finally, if Si=0, then the queue received exactly its fair share of resources.

A container object may be used for the output of the aforementioned interface, such as to store and index the starvation factor and expected fair usage for each queue as well as to maintain the queues in a sorted order by a starvation factor.

For example, the fair usage monitor takes the container object as an input and categorizes queues into FAIR, VICTIM, and OFFENDER buckets using a combination of, for example, starvation factor and longest waiter information from each queue. For example, a VICTIM is any queue with starvation factor of 0.5 or higher (jobs receiving 50% or less thread time than they should have received) and experiencing delays of a predetermined time period, such as 20 minutes or more. An OFFENDER is any queue with starvation factor of −0.5 or lower (jobs receiving 50% or more thread time than it should have received). All other queues are considered FAIR.

Within each category, requests are ranked by a user-specified order (by default, it may be by increasing the starvation factor). One extension in the fair usage monitor is that requests may be ordered by a product of starvationFactor*expectedFairUsage. For VICTIMs, this ranks the queues that have been deprived of the largest amount of thread time at the bottom. For OFFENDERs, this ranks queues that monopolized the largest amount of thread time at the top. In practice, this allows for a quick identification of the highest priority VICTIM to promote first and the candidate OFFENDER to demote which can free up the most amount of thread time. Further, queues with high expectedFairUsage may take precedence over those with high starvationFactor because high expectedFairUsage may imply either a higher weight or a longer queuing time.

Further, in one embodiment, calculation logic 827 of fair usage monitor 264 obtains data from collection logic 813 of aggregator 809, where the data is collected by collection logic 813 and includes statistics and measurements relating to thread time and queuing time measurements for tenants and/or job type. Upon obtaining the data, calculation logic 827 then combines these measurements with any in-flight messages (which are long running jobs that are still in progress and not yet completed) and further, groups these measurements by physical queues (e.g., tenants and job types belonging to the same queue are tallied accordingly). Further, calculation logic 827 then groups the queues by nodes (e.g., real application cluster (RAC) nodes, etc.) and filters out any such nodes with rules (e.g., suspend rules, etc.) in place. Any resultant measurements are used by calculation logic 827 to calculate other factors, such as starvation factor, and, in turn, categorize queues into one or more of FAIR, VICTIM, and OFFENDER buckets.

In one embodiment, enforcement logic 803 may be invoked to enforce fair usage as decided by decision logic 801 and determined by fair usage monitor 264 based on data collected by aggregator 809. For example, enforcement logic 803 enforces fairness using a combination of promotion of victims to a higher tier of service and demotion of offenders to a lower tier.

For example, if there are two tiers of queues and two job types, where tier 1 has jobs processed on all (100%) application servers and tier 2 has jobs processed on half (50%) the application servers, and that we have two job types with each job type bound by different tiers, such as job type 1 with tier 1, and job type 2 with tier 2. In one embodiment, each job type gets mapped to a physical queue, such as jobs type 1 are assigned to tier 1 queue, while jobs type 2 are assigned to tier 2 queue. An application server may be partitioned into 2 tiers and selectively processes jobs from tier 1 and tier 2 queues based on which partition they belong. To partition application servers, first, a unique slot number may be assigned to each application server, such as by simply ordering N application servers sequentially by host name and number them from 1 to N. With 2 tiers, application servers with odd slot numbers may be assigned to tier 1, and application servers with even slot numbers may be assigned to tier 2. To generalize this, with k tiers, an application server with slot number, s, is assigned to a tier as follows: (s−1) % K+1.

Continuing with the earlier example, application servers may be grouped into 2 tiers as follows: tier 1 application server to process jobs from only tier 1 queues (e.g., job type 1 only), tier 2 application server to process jobs from both tier 1 and tier 2 queues (e.g., both job type 1 and type 2). Given the above scenario, fair usage monitor 264 may trigger its calculation logic 807 to figure out the expected shared of thread time that each job type may receive. Suppose there is an equal number of application servers in each tier (e.g., one application server in each tier), the share of resources may be determined as follows: job type 1 may run exclusively on tier 1 application servers, receiving at least 50% of the total thread time, and job type 1 also runs on tier 2 application servers, but it competes (on equal footing) with tier 2, taking half of the remaining 50% or an additional 25% of total thread time. Summing fractions from both tiers gives job type 1 75% of the total thread time, leaving job type 2 with the remaining 25% of the total thread time.

It is contemplated that in actual situations, resource mechanism 110 may treat resources at granularity of individual threads, different weights for job types, and numerous tiers, etc., and so embodiments are not limited to the preceding example or any other specific examples, numbers, percentages, factors, features, etc., discussed throughout this document.

Figure 9:
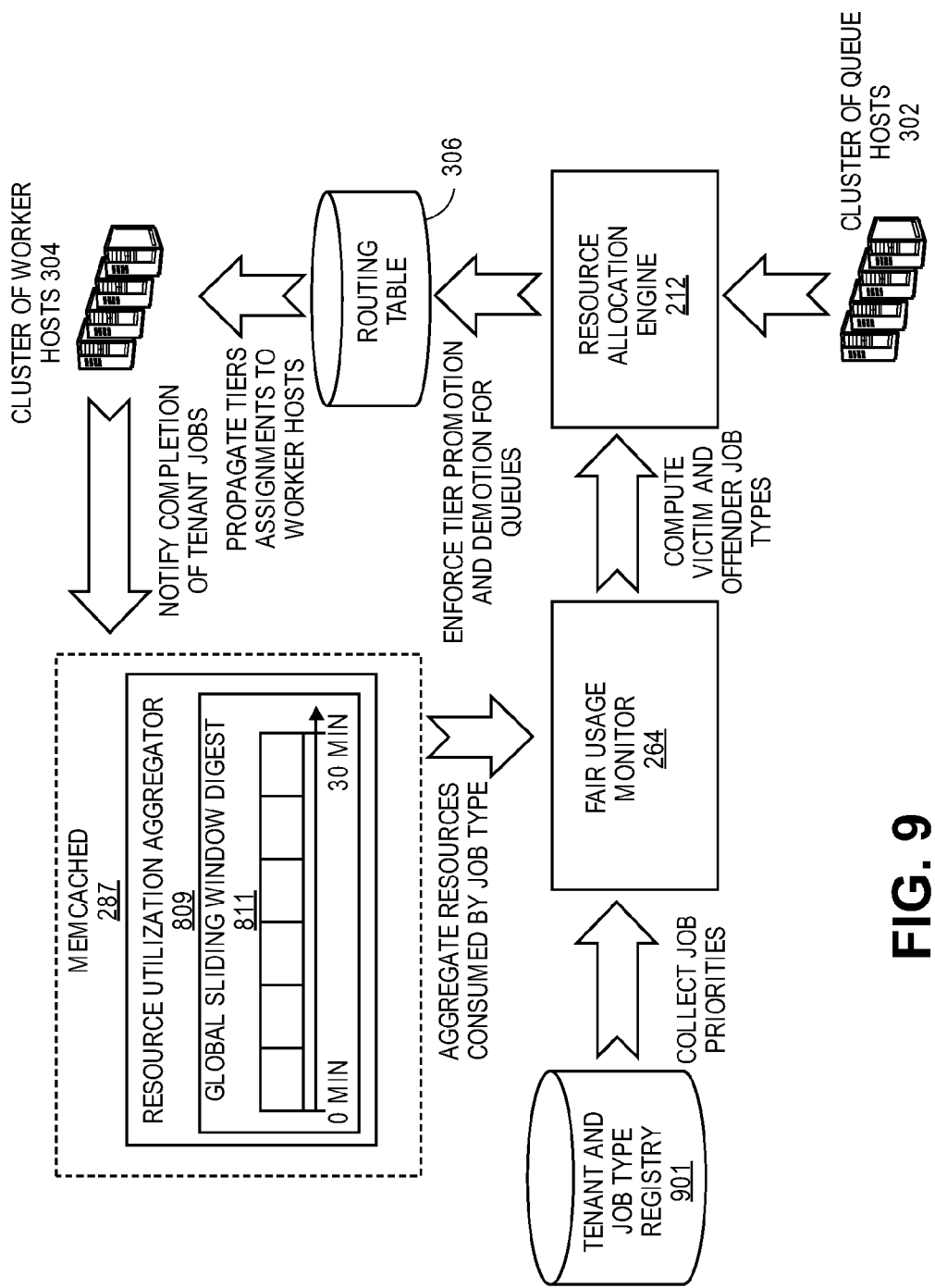
FIG. 9 illustrates an architecture for facilitating tiered service model-based fair allocation of resources of application servers according to one embodiment.

FIG. 9 illustrates an architecture for facilitating tiered service model-based fair allocation of resources of application servers according to one embodiment. As illustrated, sliding window 811 at aggregator 809 associated with memcache 287 works with data collection logic 813 of FIG. 8 to collect statistics relating to organizations, job types, etc., and these statistics, such as aggregated resources consumed by job types, are forwarded on to fair usage monitor 264 to work with fair usage calculation logic 807 of FIG. 8 to evaluate and determine fair usage relating to each tenant, job type, queue, tier, etc. Similarly, in one embodiment, job priorities are collected by tenant and job type registry 901 of database 280 of FIG. 8 and forwarded on to fair usage monitor 264 to be used with determination of fair usage.

In one embodiment, upon determining fair usage, fair usage monitor 264 assigns classifications to job types and/or queues, where such classifications include one or more of VICTIM, OFFENDER, FAIR, etc., and these assigned classification along with any other relevant data is provided to resource allocation engine 212 for further evaluation and enforcement of fair usage, where resource allocation engine 212 receives additional data from and is further in communication with cluster of queue hosts 302. As previously described with reference to FIG. 8, decision logic 801 may further evaluate fair usage and determine tier promotion and demotion of queues, while enforcement logic 803 may then be used to enforce the promotion and demotion of queues by forwarding enforcement decision to routing table 306 which then propagates tiers assignments to worker hosts 304 which, in turn, sends out notification of completion of tenant jobs.

Figure 10A:
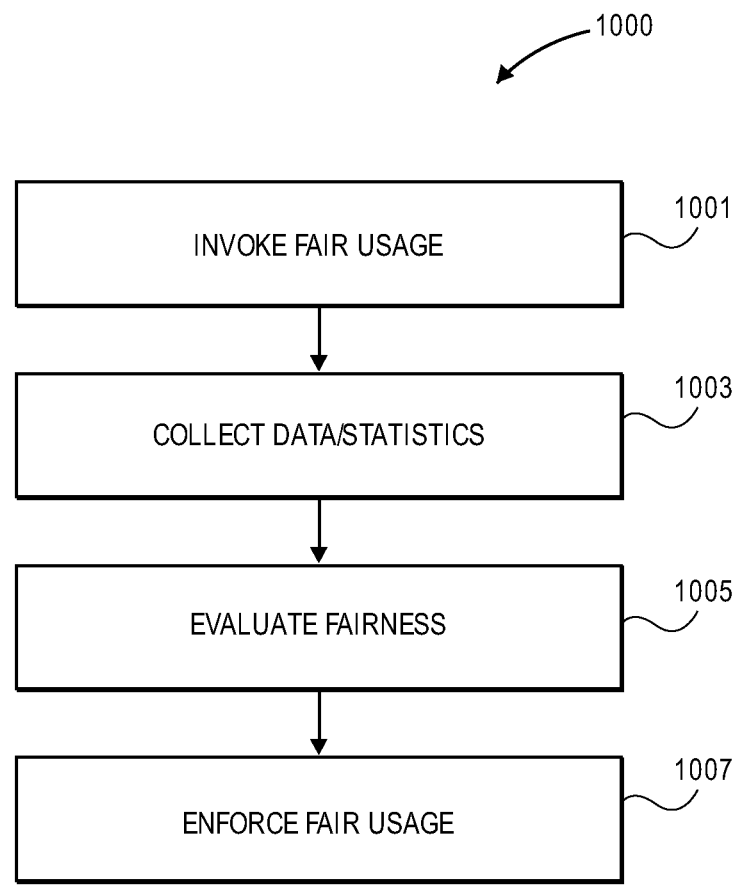
FIG. 10A illustrates a method for facilitating tiered service model-based fair allocation of resources of application servers according to one embodiment.

FIG. 10A illustrates a method 1000 for facilitating tiered service model-based fair allocation of resources of application servers according to one embodiment. Method 1000 may be performed by processing logic that may comprise hardware (e.g., circuitry, dedicated logic, programmable logic, etc.), software (such as instructions run on a processing device), or a combination thereof. In one embodiment, method 1000 may be performed by thread resource management mechanism 110 of FIG. 8.

Method 1000 begins at block 1001 with invoking fair usage of queues at multiple tiers for various job types. In one embodiment, the invocation may be performed periodically, such as every 15 minutes, to determine any prior router changes (e.g., addition/removal of suspend rules, reassigning queues from inactive brokers, etc.) as first committed to a database, such as database 280 of FIG. 8. In one embodiment, at block 1003, data including statistics are collected using collection logic 813 and sliding window 811 of aggregator 809 of FIG. 8, where statistics include thread time, queueing time, message processed/failed, etc., based on per tenant, per message/job type, etc., in mem-cache, such as mem-cache 287 of FIG. 8. For example, any data collected form the mem-cache may be grouped by physical queues and collected with the longest waiter dequeuer latency and queue depth for each queue, where any candidate VICTIMS queues may be determined based on longest waiter, and any queue may be grouped by a node. Additional data collection features may include filtering out statistics that are older than the oldest job across all queues of a node along with ignoring any old job so that the focus is placed on pending jobs.

At block 1005, fairness or fair usage is evaluated where fair usage monitor 264 and its calculation logic 807 of FIG. 8 are triggered, which leads to detailed evaluation and computation of fair usage by taking into account any number of factors, such as (without limitation): 1) assigning custom weights for indicating, for example, that dashboard message may be twice as important as physical deletes; 2) computing the actual thread time and weight for each queue for a period of time (e.g., 5 minutes interval) as well as the total thread time and weight for all queues for each 5 minute interval. For example, each application server may report to mem-cache thread times (aggregated into time buckets, such as 5 minute buckets) for both jobs currently in progress or has finished processing; 3) computing the expected fair thread time for each queue as a function of its weight and total available thread time for a time interval, such as 5 minute interval, where queues with higher queuing times are assigned higher expected thread time; 4) summing the actual thread time and expected fair thread time for each queue across a time and interval and computing its starvation factor; 5) invoking and assigning categories, such as VICTIM, OFFENDER, FAIR, etc., to categorize job types; 6) for example, if starvation factor is >0.5 (below 50% expected fair thread time), then job type is marked VICTIM; 7) for example, if starvation factor is <0.5 (above 50% of expected fair thread time), then job type is marked OFFENDER; 8) for example, the remaining job types are marked FAIR; and 9) all job types may be sorted by increasing order of relevance or starvation factor*expected fair usage.

At block 1007, fair usage is enforced using enforcement logic 803 of resource allocation engine 212 of FIG. 8 to enforce the findings of maintenance and demotions and promotions of queues to different tiers based on various determinations and evaluations made in previous processes. In one embodiment, queues are maintained in or demoted or promoted to different queues based on thread time consumed by each queue to ensure that thread time is distributed fairly across various queues such that enforcement decisions are based on corresponding categories assigned to the queues, such as VICTIM (to be promoted to another tier), OFFENDER (to be demoted to another tier), and FAIR (to be maintained in the same tier).

Figure 10B:
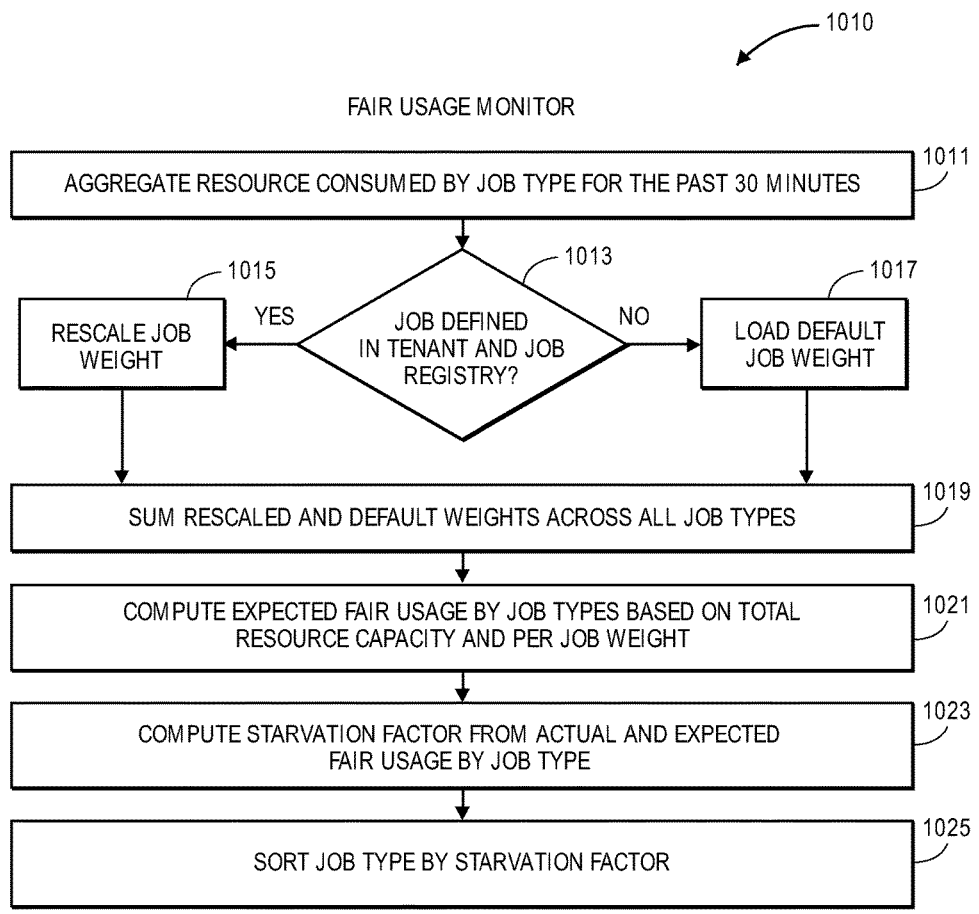
FIG. 10B illustrates a method for fair usage monitoring for facilitating tiered service model-based fair allocation of resources of application servers according to one embodiment.

FIG. 10B illustrates a method 1010 for fair usage monitoring for facilitating tiered service model-based fair allocation of resources of application servers according to one embodiment. Method 1010 may be performed by processing logic that may comprise hardware (e.g., circuitry, dedicated logic, programmable logic, etc.), software (such as instructions run on a processing device), or a combination thereof. In one embodiment, method 1010 may be performed by thread resource management mechanism 110 of FIG. 8.

Method 1010 begins at block 1011 with aggregating of resources consumed by a job type for a period of time, such as 30 minutes, which may be performed by using sliding window 811 and collection logic 813 of FIG. 8. At block 1013, a determination is made as to whether the job type is defined in a tenant and job registry, such as tenant and job registry 901 of FIG. 9. If yes, the process continues with rescaling of job weight at block 1015. If not, a default job weight is loaded at block 1017. At block 1019, rescaled and default weights of blocks 1015 and 1017, respectively, are summed across all job types. At block 1021, expected fair usage is computed by job types based on total resource capacity and per job weight. Further, in one embodiment, at block 1023, starvation factor is computed for each job type based on the actual and expected fair usage relating to that job type. At block 1025, job types are sorted according to their corresponding starvation factor.

Figure 10C:
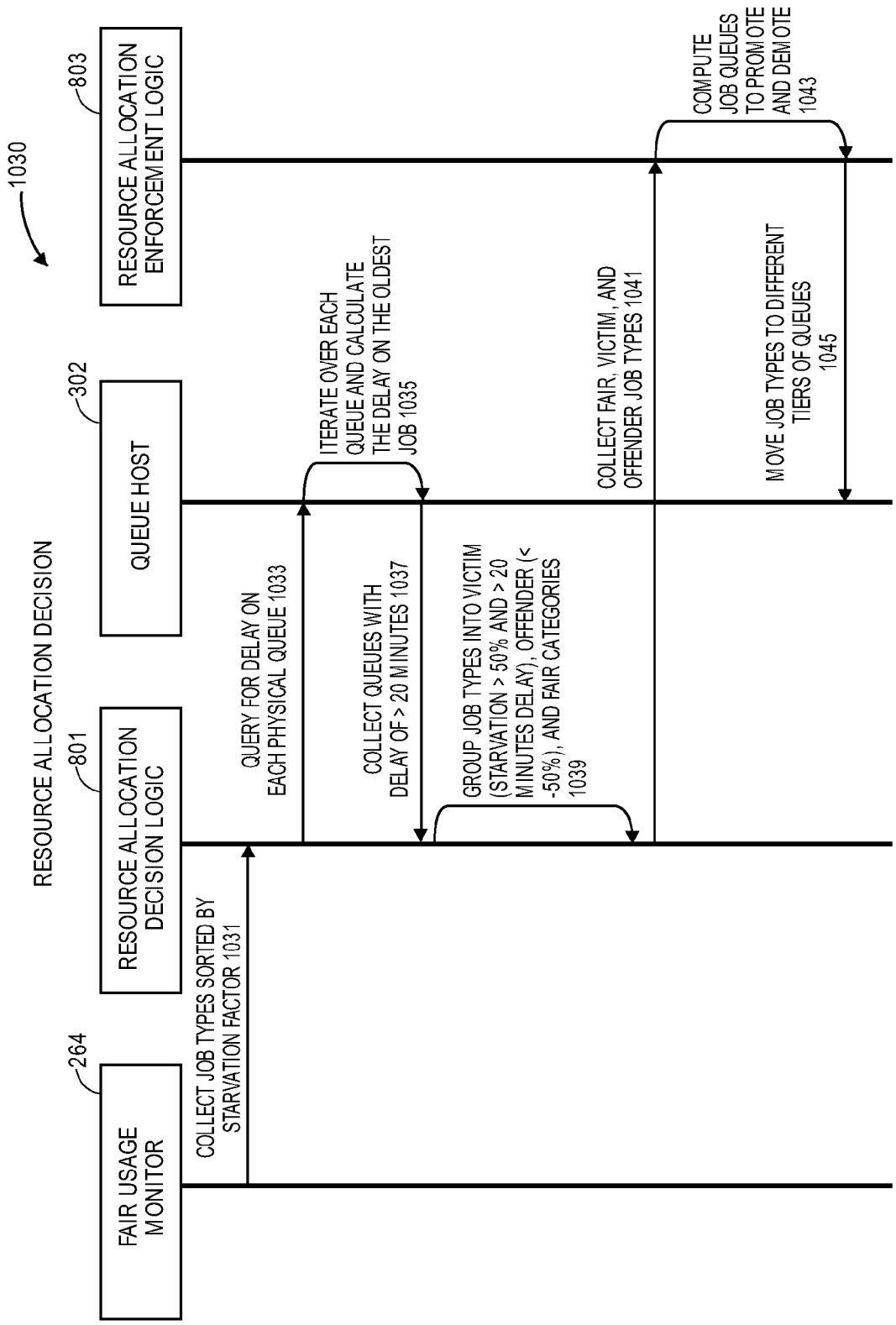
FIG. 10C illustrates a transaction sequence for resource allocation decision for facilitating tiered service model-based fair allocation of resources of application servers according to one embodiment.

FIG. 10C illustrates a transaction sequence 1030 for resource allocation decision for facilitating tiered service model-based fair allocation of resources of application servers according to one embodiment. Transaction sequence 1030 may be performed by processing logic that may comprise hardware (e.g., circuitry, dedicated logic, programmable logic, etc.), software (such as instructions run on a processing device), or a combination thereof. In one embodiment, transaction sequence 1030 may be performed by thread resource management mechanism 110 of FIG. 8.

Transaction sequence 1030 begins at fair usage monitor 264 with collecting job types sorted by starvation factor 1031 that is then communicated to resource allocation decision logic 801 which queries for delay on each physical queue 1033 at queue host 302. At queue host 302, iteration over each queue along with calculation of the delay on the oldest job 1035 is performed. Further, queue host 302 collects and communicates a set of queues with a delay of more than a predefined time period (e.g., 20 minutes) 1037 to resource allocation decision logic 801 where job types are grouped into a number of categories, such as VICTIM (e.g., starvation factor of greater than 50% and 20 minutes, etc.), OFFENDER (e.g., starvation factor of less than 50%, etc.), and FAIR 1039.

In one embodiment, the one or more assigned and grouped categories of VICTIM, OFFENDER, and FAIR are collected by enforcement logic 803 from decision logic 801 and using this information, job queues are computed to be promoted (for VICTIM) or demoted (for OFFENDER) or maintained (for FAIR) 1043 at enforcement logic 803. Having computed the job queues, any job types are moved to different tiers or queues 1045 by queue host 302 as enforced by enforcement logic 803.

Figure 10D:
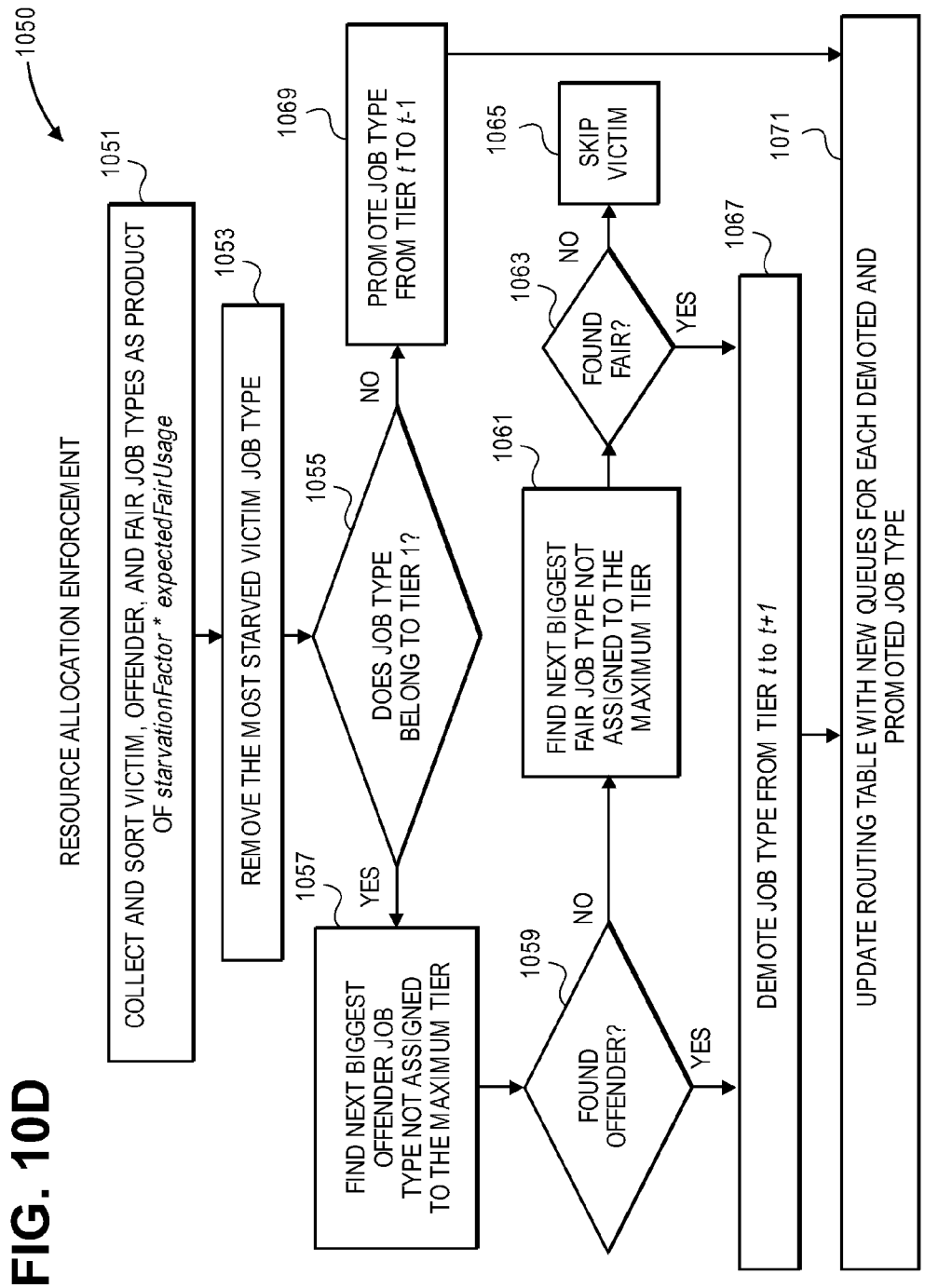
FIG. 10D illustrates a method for resource allocation enforcement for facilitating tiered service model-based fair allocation of resources of application servers according to one embodiment.

FIG. 10D illustrates a method 1050 for resource allocation enforcement for facilitating tiered service model-based fair allocation of resources of application servers according to one embodiment. Method 1050 may be performed by processing logic that may comprise hardware (e.g., circuitry, dedicated logic, programmable logic, etc.), software (such as instructions run on a processing device), or a combination thereof. In one embodiment, method 1050 may be performed by thread resource management mechanism 110 of FIG. 8.

Method 1050 may begin with block 1051 with collecting and sorting of VICTIM, OFFENDER, and FAIR job types as product of the following formula: starvationFactor*expected FairUsage. At block 1053, the most starved VICTIM job type is removed based on the aforementioned formula and, at block 1055, a determination is made as to whether the job type belongs to tier 1. If yes, at block 1057, a next biggest OFFENDER job type is found that is not assigned to the maximum tier and, at block 1059, a determination is made as to whether the OFFENDER is found. If not, at block 1061, a next biggest FAIR job type is found that is not assigned to the maximum tier and, at block 1063, a determination is made as to whether the FAIR job type is found. At block 1065, the FAIR job type is not found, the VICTIM is skipped.

If the FAIR job type is not found or, referring back to block 1059, if the OFFENDER is found, the job type may be demoted from current tier to a lower tier, such as from tier t to tier t+1 (e.g., tier 2 to tier 2+1 or 3). The process may then continue with updating of routing table with new queues with each demoted job type at block 1071. Similarly, referring back to block 1055, if the job type does not belong to tier 1, the job type is promoted from its current tier to the next highest tier, such from tier t to t−1 (e.g., tier 3 to tier 3-1 or 2) at block 1069 and the routing table is updated with the new queues for each promoted job type at block 1071.

Figure 10E:
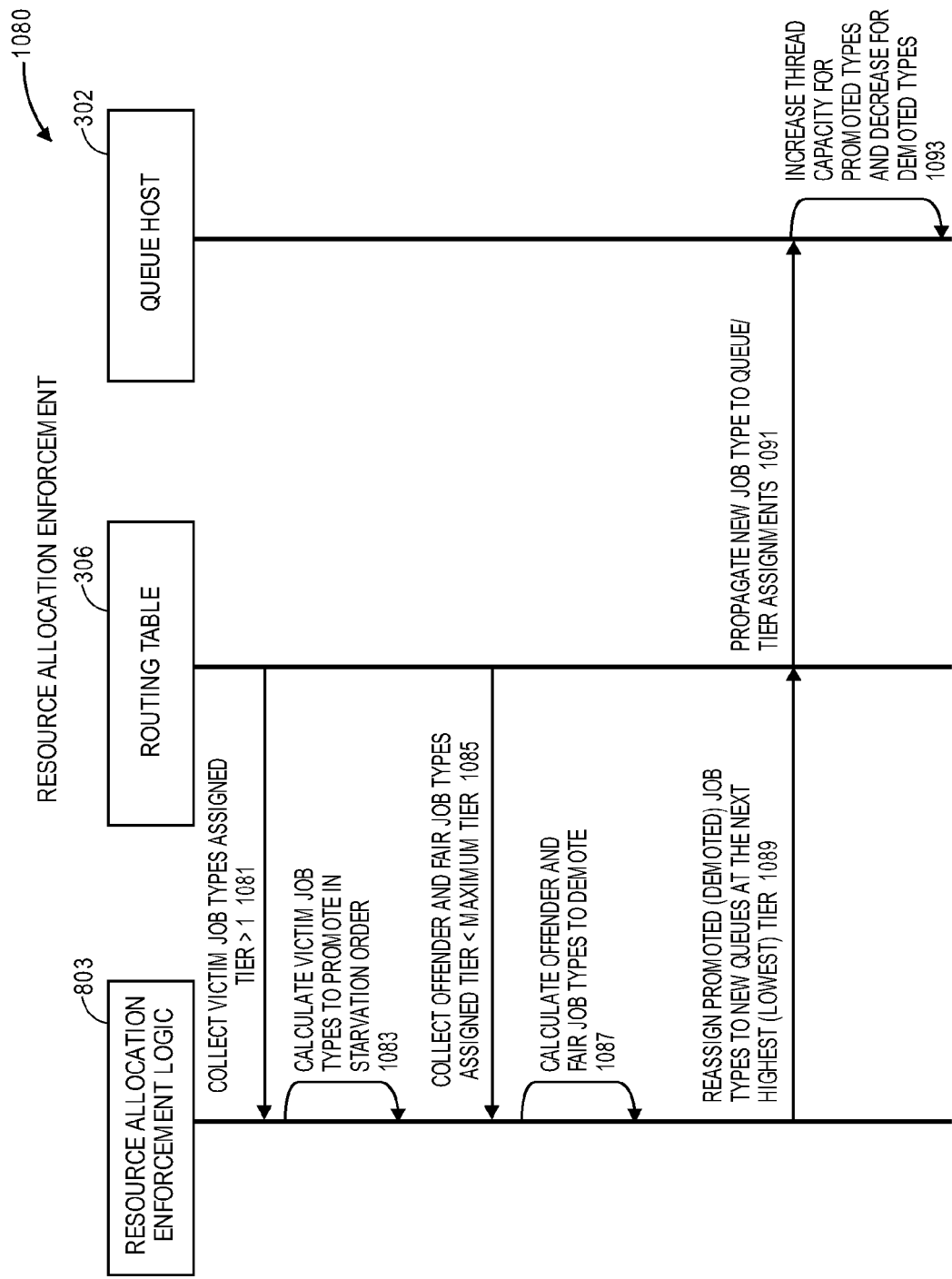
FIG. 10E illustrates a transaction sequence 1080 for resource allocation decision for facilitating tiered service model-based fair allocation of resources of application servers according to one embodiment.

FIG. 10E illustrates a transaction sequence 1080 for resource allocation decision for facilitating tiered service model-based fair allocation of resources of application servers according to one embodiment. Transaction sequence 1080 may be performed by processing logic that may comprise hardware (e.g., circuitry, dedicated logic, programmable logic, etc.), software (such as instructions run on a processing device), or a combination thereof. In one embodiment, transaction sequence 1080 may be performed by thread resource management mechanism 110 of FIG. 8.

Transaction sequence 1080 may begin with communication between routing table 306 and enforcement logic 803 where VICTIM job types that are assigned to greater than tier 1 are collected or obtained 1081 by enforcement logic 803 from routing table 306 and at enforcement logic 803, VICTIM job types are calculated to be promoted in the starvation order 1083. Similarly, in one embodiment, OFFENDER and FAIR job types that are assigned to less than the maximum tier are collected and obtained 1085 by enforcement logic 803 from routing table 306 and at enforcement logic 803, OFFENDER and FAIR job types are calculated to be demoted in the starvation order 1087. In one embodiment, at 1089, promoted and demoted job types are reassigned to new queues at the next highest and lowest tiers, respectively, as determined by enforcement logic 803 and this enforcement strategy is recommended to routing table 306 to route, using routing framework 266 of FIG. 8, to complete the enforcement. Further, the job types are propagated according to their queue and/or tier assignments 1091 and the corresponding thread capacity is increased for promoted job types and decreased for demoted job types 1093.

Figure 5:
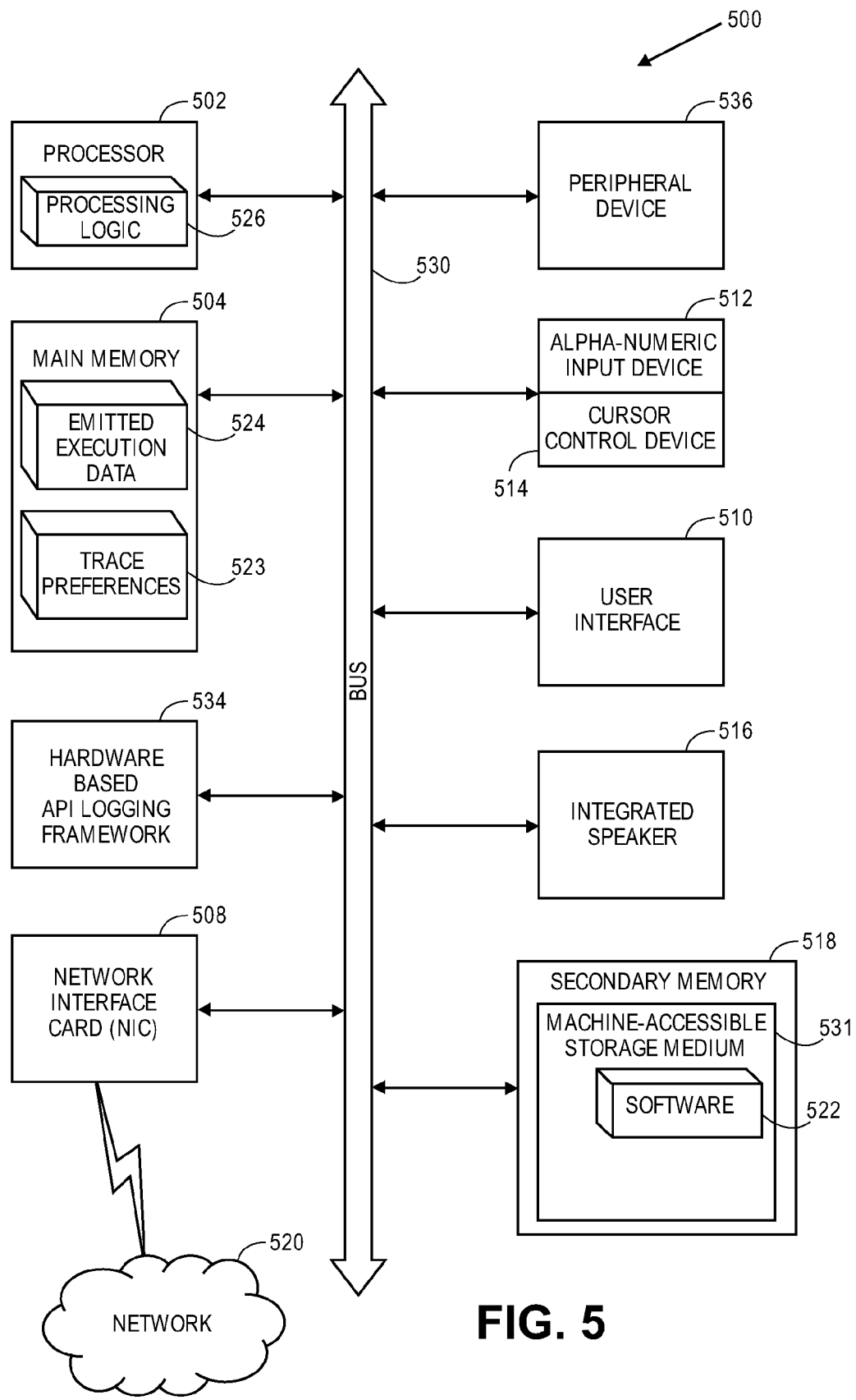
FIG. 5 illustrates a computer system according to one embodiment.

Referring now to FIG. 5, it illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and computing device 290 of FIG. 1 and FIG. 2, respectively. In alternative embodiments, the machine may be connected (e.g., networked) to other machines in a network (such as host machine 100 of FIG. 1 connected with client machine 290 over network 285 of FIG. 2), such as a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of thread resource management mechanism 110 as described with reference to FIG. 1 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of thread resource management mechanism 110 as described with reference to FIG. 1 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
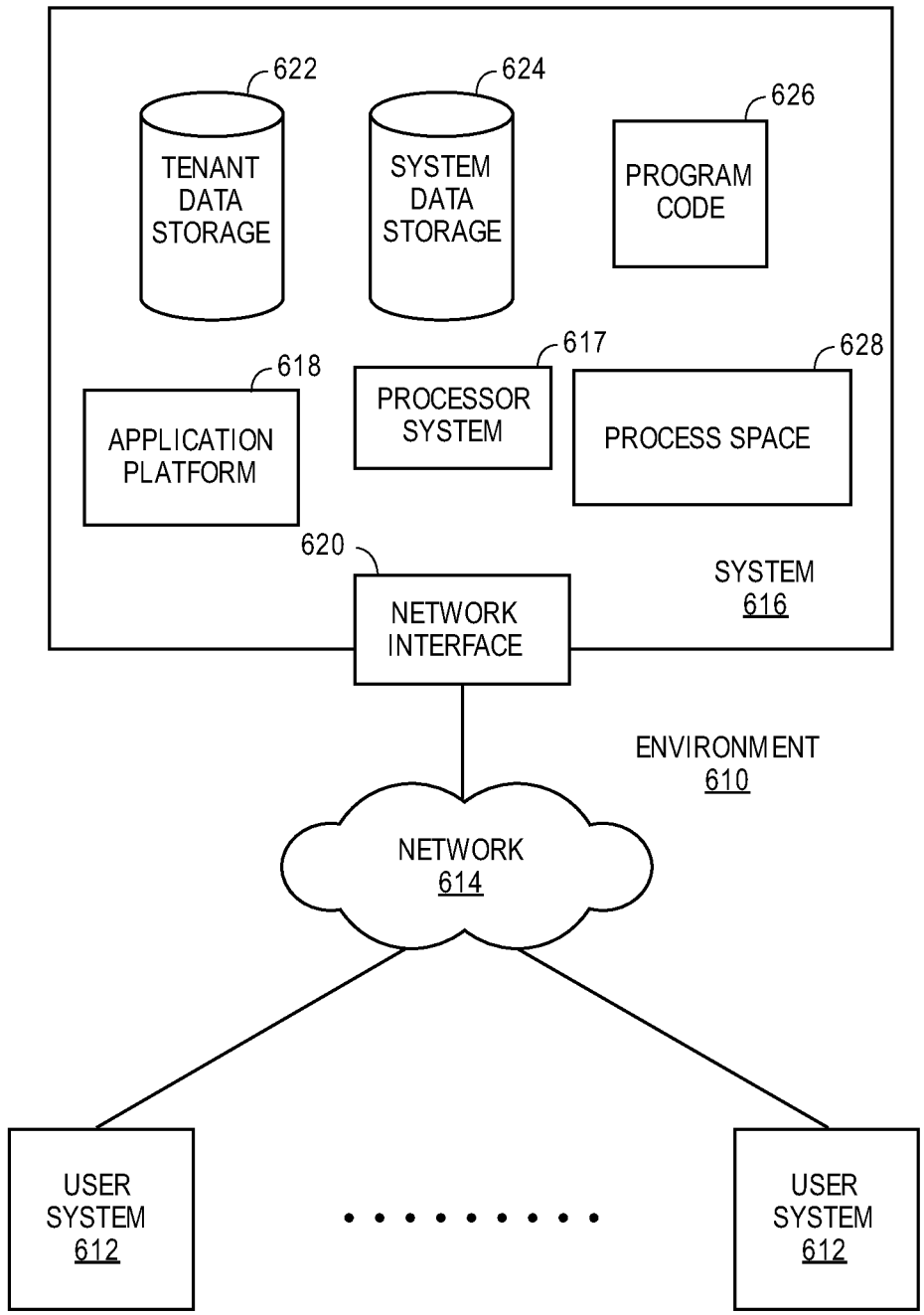
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method comprising:
    collecting, by a resource-management server computing device of a database system, data relating to job types associated with multiple tenants within a multi-tenant environment;
    based on the data, computing an actual resource usages and expected resource allocations of the job types and actual resource usages and expected resource allocations of the tenants;
    assigning the job types to service tiers based on the actual resource usages and the expected resource allocations associated with the job types, wherein each job type is at least one of a high-tiered job type or a low-tiered job type;
    assigning the tenants to the service tiers based on the actual resource usages and the expected resource allocations associated with the tenants, wherein each tenant is classified as a high-tiered tenant type or a low-tiered tenant type; and
    real-time reassigning and executing of the job types to one or more of the service tiers while ensuring that resources are distributed between the job types and the tenants such that actual resource usage does not exceed expected resource allocation for each job type and each tenant.

2. The method of claim 1, wherein the data comprises statistics relating to at least one of thread time, queueing time, processing jobs, and failed jobs relating to the job types associated with the tenants.

3. The method of claim 1, further comprising determining a resource-consumption factor for a job type or a tenant based on an actual resource usage and an expected resource allocation of the job type or the tenant, respectively.

4. The method of claim 1, wherein the job types and the tenants are assigned to service tiers based on one or more resource-consumption factors indicating consumption of the resources by at least one of the job types and the tenants, wherein the resource-consumption factors include at least one of 1) victim, when the actual resource usages of the job types or the tenants are less than the expected resource allocation, 2) offender, when the actual resource usages of the job types or the tenants are greater than the expected resource allocation, and 3) fair, when the actual resource usages of the job types or the tenants are equal to the expected resource allocation.

5. The method of claim 4, wherein each job type is classified as at least one type of multi-tiered job types including one or more of the high-tiered job type and the low-tiered job type.

6. The method of claim 4, wherein each tenant is classified as at least one type of multi-tiered tenant types including one or more of the high-tiered tenant type and tenant type.

7. The method of claim 1, wherein the job types are requested through job requests received from the tenants and submitted by users representing the tenants, wherein the job requests are placed by the users via one or more computing devices over one or more networks, wherein the one or more network include a Cloud-based network or the Internet.

8. A system comprising:
a processor and a memory to execute instructions at the system; and
a mechanism, wherein the processor to facilitate the mechanism to: collect data relating to job types associated with multiple tenants within a multitenant database environment;
compute, based on the collected data, actual resource usages and expected resource allocations of the job types and actual resource usages and expected resource allocations of the tenants;
assign the job types to service tiers based on the actual resource usages and the expected resource allocations associated with the job types, wherein each job type is at least one of a high-tiered job type or a low tiered job type;
assign the tenants to the service tiers based on the actual resource usages and the expected resource allocations associated with the tenants, wherein each tenant is classified as a high-tiered tenant or a low-tiered tenant type; and
in real time, reassigning and executing of the job types to one or more of the service tiers while ensuring that resources are distributed between the job types and the tenants such that the actual resource usages does not exceed the expected resource allocation for each job type and each tenant.

9. The system of claim 8, wherein the data comprises statistics relating to at least one of thread time, queueing time, processing jobs, and failed jobs relating to the job types associated with the tenants.

10. The system of claim 8, wherein the mechanism is further to determine a resource-consumption factor for a job type or a tenant based on an actual resource usage and an expected resource allocation of the job type or the tenant, respectively.

11. The system of claim 8, wherein the job types and the tenants are assigned to service tiers based on one or more resource-consumption factors indicating consumption of the resources by at least one of the job types and the tenants, wherein the resource-consumption factors include at least one of 1) victim, when the actual resource usages of the job types or the tenants are less than the expected resource allocation, 2) offender, when the actual resource usages of the job types or the tenants are greater than the expected resource allocation, and fair, when the actual resource usages of the job types or the tenants are equal to the expected resource allocation.

12. The system of claim 11, wherein each job type is classified as at least one type of multi-tiered job types including one or more of the high-tiered job type and the low-tiered job type.

13. The system of claim 11, wherein each tenant is classified as at least one type of multi-tiered tenant types including one or more of the high-tiered tenant type and the low-tiered tenant type.

14. The system of claim 8, wherein the job types are requested through job requests received from the tenants and submitted by users representing the tenants, wherein the job requests are placed by the users via one or more computing devices over one or more networks, wherein the one or more networks include a Cloud-based network or the Internet.

15. A non-transitory machine-readable medium comprising a plurality of instructions which, when executed by a processing device, cause the processing device to perform operations comprising:
collecting data relating to job types associated with multiple tenants within a multi-tenant database environment;
computing, based on the collected data, an actual resource usages and expected resource allocations of the job types and actual resource usages and expected resource allocations of the tenants;
assigning the job types to service tiers based on the actual resource usages and the expected resource allocations associated with the job types;
assigning the tenants to the service tiers based on the actual resource usages and the expected resource allocations associated with the tenants, wherein each tenant is classified as a high-tiered tenant type or a low-tiered tenant type; and
real-time reassigning and executing of the job types to one or more of the service tiers while ensuring that resources are distributed between the job types and the tenants such that actual resource usage does not exceed expected resource allocation for each job type and each tenant.

16. The machine-readable medium of claim 15, wherein the data comprises statistics relating to at least one of thread time, queueing time, processing jobs, and failed jobs relating to the job types associated with the tenants.

17. The machine-readable medium of claim 15, wherein the operations comprise determining a resource-consumption factor a job type or a tenant based on an actual resource usage and an expected resource allocation of the job type or the tenant, respectively.

18. The machine-readable medium of claim 15, wherein the job types and the tenants are assigned to service tiers based on one or more resource-consumption factors indicating consumption of the resources by at least one of the job types and the tenants, wherein the resource-consumption factors include at least one of 1) victim, when the actual resource usages of the job types or the tenants are less than the expected resource allocation, 2 offender, when the actual resource usages of the job types or the tenants are greater than the expected resource allocation, and 2 fair, when the actual resource usages of the job types or the tenants are equal to the expected resource allocation.

19. The machine-readable medium of claim 18, wherein each job type is classified as at least one type of multi-tiered job types including one or more of the high-tiered job type and the low-tiered job type.

20. The machine-readable medium of claim 18, wherein each tenant is classified as at least one type of multi-tiered tenant types including one or more of the high-tiered tenant type and the low-tiered tenant type.

21. The machine-readable medium of claim 15, wherein the job types are requested through job requests received from the tenants and submitted by users representing the tenants, wherein the job requests are placed by the users via one or more computing devices over one or more networks, wherein the one or more networks include a Cloud-based network or the Internet.

* * * * *